United States Patent
Yushan et al.

(10) Patent No.: US 9,214,680 B2
(45) Date of Patent: Dec. 15, 2015

(54) PLATINUM AND PLATINUM BASED ALLOY NANOTUBES AS ELECTROCATALYSTS FOR FUEL CELLS

(75) Inventors: Yan Yushan, Riverside, CA (US); Zhongwei Chen, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 962 days.

(21) Appl. No.: 12/224,197

(22) PCT Filed: Feb. 24, 2007

(86) PCT No.: PCT/US2007/005053
§ 371 (c)(1),
(2), (4) Date: Feb. 26, 2009

(87) PCT Pub. No.: WO2007/100811
PCT Pub. Date: Sep. 7, 2007

(65) Prior Publication Data
US 2009/0220835 A1     Sep. 3, 2009

Related U.S. Application Data

(60) Provisional application No. 60/776,301, filed on Feb. 24, 2006.

(51) Int. Cl.
*B01J 23/56* (2006.01)
*H01M 4/92* (2006.01)
(Continued)

(52) U.S. Cl.
CPC . *H01M 4/92* (2013.01); *C22C 5/04* (2013.01); *H01M 4/8814* (2013.01);
(Continued)

(58) Field of Classification Search
USPC .......................................... 429/30; 428/408
See application file for complete search history.

(56) References Cited

U.S. PATENT DOCUMENTS

| | | | |
|---|---|---|---|
| 6,790,426 B1 * | 9/2004 | Ohsaki ..................... | 423/447.2 |
| 2004/0197638 A1 * | 10/2004 | McElrath et al. ............... | 429/44 |

(Continued)

FOREIGN PATENT DOCUMENTS

| | | |
|---|---|---|
| CN | 1678514 A | 10/2005 |
| CN | 101432907 A | 5/2009 |

(Continued)

OTHER PUBLICATIONS

"Noble-Metal Nanotubes (Pt, Pg, Ag) from Lyotropic Mixed-surfactant liquid-crystal template". Kijima et al.*

(Continued)

*Primary Examiner* — Melvin C Mayes
*Assistant Examiner* — Colette Nguyen
(74) *Attorney, Agent, or Firm* — Schwegman Lundberg & Woessner, P.A.

(57) ABSTRACT

Electrocatalyst durability has been recently recognized as one of the most important issues that have to be addressed before the commercialization of the proton exchange membrane fuel cells (PEMFCs). The present invention is directed to a new class of cathode catalysts based on supportless platinum nanotubes (PtNTs) and platinum alloy nanotubes, for example, platinum-palladium nanotubes (PtPdNTs), that have remarkable durability and high catalytic activity. Due to their unique combination of dimensions at multiple length scales, the platinum nanotubes of the present invention can provide high platinum surface area due to their nanometer-sized wall thickness, and have the potential to eliminate or alleviate most of the degradation pathways of the commercial carbon supported platinum catalyst (Pt/C) and unsupported platinum-black (PtB) as a result of their micrometer-sized length. The platinum nanotube catalysts of the present invention asymptotically approach a maximum of about twenty percent platinum surface area loss in durability test, while the commercial PtB and Pt/C catalysts lose about fifty-one percent and ninety percent of their initial surface area, respectively. Moreover, the PtNT and PtPdNT catalysts of the present invention show higher mass activity and much higher specific activity than commercial Pt/C and PtB catalysts.

14 Claims, 18 Drawing Sheets

(51) Int. Cl.
C22C 5/04 (2006.01)
H01M 4/88 (2006.01)
H01M 8/10 (2006.01)

(52) U.S. Cl.
CPC ............ *H01M 4/921* (2013.01); *H01M 4/928* (2013.01); *H01M 2008/1095* (2013.01); *Y02E 60/50* (2013.01); *Y02E 60/523* (2013.01)

(56) References Cited

U.S. PATENT DOCUMENTS

2005/0229744 A1* 10/2005 Kijima .......................... 75/255
2005/0245390 A1* 11/2005 Ota et al. ...................... 502/182

FOREIGN PATENT DOCUMENTS

| EP | 2008322 A2 | 12/2008 |
|---|---|---|
| JP | 200434228 A | 2/2004 |
| JP | 2005203332 A | 7/2005 |
| JP | 2005302305 A | 10/2005 |
| JP | 2007173109 A | 7/2007 |
| JP | 2008503070 A | 1/2008 |
| JP | 2008523565 A | 7/2008 |
| WO | WO-2005124916 A2 | 12/2005 |
| WO | WO-2007100811 A3 | 9/2007 |

OTHER PUBLICATIONS

"Controlling the Aspect Ratio of Inorganic Nanorods and nanowires". by Catherine J. Murphy et al. Advanced materials. 2002. 14.*
"A class of non-precious metal composite catalysts for fuel cells". Rajesh Basham et al. Natture. Sep. 2006.*
"Noble Metal Nanotubes (Pt, Pd, Ag) from Lyotropic Mixed-Surfactant Liquid_Crustal Templates". Angew Chem. Int Ed. 2004, 43, 228-232.*
U. S. Department of Energy. DOE's Fuel Cell Report to Congress, (2003).
B. Mayers, X. C. Jiang, D. Sunderland, B. Cattle, and Y. N. Xi a, *Journal of the American Chemical Society*. 125, 13364 (2003).
Y. G. Sun, B. Mayers, T. Herricks, and Y. N. Xia, *Nano Letters*. 3, 955 (2003).
Y. G. Sun and Y. N. Xia, *Advanced Materials*. 14,833 (2002).
Y. G. Sun, Y. D. Yin, B. T. Mayers, T. Herricks, and Y. N. Xia, *Chemistry of Materials*. 14,4736 (2002).
B. Gates, Y. D. Yin, and Y. N. Xia, *Journal of the American Chemical Society*. 122, 12582 (2000).
C. J. Murphy and N. R. Jana, *Advanced Materials*. 14,80 (2002.
B. Mayers, B. Gates, and Y. N. Xia, *Abstracts of Papers of the American Chemical Society*. 221, U367 (2001).
Rajesh Bashyam & Piotr Zelenay, *Nature*, vol. 443, 63-66 (2003).
Vojislav R. Stamenkovic, Ben Fowler, Bongjim Simon Mun, Guofeng Wang, Philip N. Ross, Chirsopher A. Lucas, Nenad M. Markovic, *Sciencexpress* 10.1126/science.1135941.
Robert Service et al., *Science*, 315, 172 (2007).
B. Cheng and E. T. Samulski, *Chemical Communications*. 2024 (2003).
T. Kijima, T. Yoshimura, M. Uota, T. Ikeda, D. Fujikawa, S. Mouri, and S. Uoyama, *Angewandte Chemie-International Edition*. 43,228 (2004).
J. Zhang, K. Sasaki, E. Sutter, R.R.Adzic, *Science* 315, 220 (2007).
European Application Serial No. 07751787.8, Communication pursuant to Rules 161 (1) and 162 EPC mailed Oct. 17, 2008, 2 pgs.
European Application Serial No. 07751787.8, Examination Notification Art. 94(3) mailed Jul. 12, 2013, 5 pgs.
European Application Serial No. 07751787.8, Extended European Search Report mailed Mar. 27, 2012, 5 pgs.
European Application Serial No. 07751787.8, Response filed Dec. 6, 2012 to Extended European Search Report mailed Mar. 27, 2012, 7 pgs.
Chinese Application Serial No. 200780014805.X, Amendment filed Sep. 14, 2009, 6 pgs.
Chinese Application Serial No. 200780014805.X, Notice of Reexamination mailed May 16, 2014, w/English translation, 9 pgs.
Chinese Application Serial No. 200780014805.X, Office Action mailed Feb. 16, 2013, w/English translation, 10 pgs.
Chinese Application Serial No. 200780014805.X, Office Action mailed May 20, 2010, w/English translation, 6 pgs.
Chinese Application Serial No. 200780014805.X, Office Action mailed Jul. 17, 2012, w/English translation, 16 pgs.
Chinese Application Serial No. 200780014805.X, Office Action mailed Dec. 23, 2011, w/English translation, 7 pgs.
Chinese Application Serial No. 200780014805.X, Reexamination Request filed May 13, 2013, w/English claims, 6 pgs.
Chinese Application Serial No. 200780014805.X, Response filed May 7, 2012 to Office Action mailed Dec. 23, 2011, 3 pgs.
Chinese Application Serial No. 200780014805.X, Response filed May 29, 2012 to Examiner Telephone Interview dated May 23, 2012, w/English claims, 3 pgs.
Chinese Application Serial No. 200780014805.X, Response filed Dec. 3, 2010 to Office Action mailed May 20, 2010, 5 pgs.
Chinese Application Serial No. 200780014805.X, Response filed Dec. 3, 2012 to Office Action mailed Jul. 17, 2012, w/English claims, 24 pgs.
European Application Serial No. 07751787.8, Response filed Nov. 16, 2013 to Office Action mailed Jul. 12, 2013, 8 pgs.
International Application Serial No. PCT/US2007/005053, Written Opinion mailed May 19, 2008, 5 pgs.
International Application Serial No. PCT/US2007/005053, International Preliminary Report on Patentability mailed Aug. 26, 2008, 6 pgs.
International Application Serial No. PCT/US2007/005053, International Search Report mailed May 19, 2008, 2 pgs.
Japanese Application Serial No. 2008-556475, Office Action mailed Oct. 16, 2012, w/English translation, 6 pgs.
Japanese Application Serial No. 2008-556475, Office Action mailed Dec. 17, 2013, w/English translation, 3 pgs.
Japanese Application Serial No. 2008-556475, Response filed Mar. 7, 2014 to Office Action mailed Dec. 17, 2013, w/English claims, 6 pgs.
Japanese Application Serial No. 2008-556475, Response filed Mar. 18, 2013 to Office Action mailed Oct. 16, 2012, 5 pgs.
Korean Application Serial No. 2008-7023301, Office Action mailed Mar. 30, 2010, w/English translation, 8 pgs.
Korean Application Serial No. 2008-7023301, Response filed Aug. 30, 2010 to Office Action mailed Mar. 30, 2010, English claims, 2 pgs.
Chinese Application Serial No. 200780014805.X, Reexamination Decision mailed Oct. 21, 2014, 8 pgs.
Chinese Application Serial No. 200780014805.X, Response filed Sep. 1, 2014 to Notice of Reexamination mailed May 16, 2014, (w/ English Translation of Claims), 4 pgs.
Indian Application Serial No. 1967/MUMNP/2008, First Examiner Report mailed Dec. 16, 2014, 2 pgs.

* cited by examiner

PLATINUM AND PLATINUM BASED ALLOY NANOTUBES AS ELECTROCATALYSTS FOR FUEL CELLS

CROSS-REFERENCES TO RELATED APPLICATION

This application is a U.S. National Stage Filing under 35 U.S.C. 371 from International Application No. PCT/US2007/005053, filed on Feb. 24, 2007, and published as WO 2007/100811 A2 on Sep. 7, 2007, which claims the benefit of U.S. Provisional Application Ser. No. 60/776,301 filed Feb. 24, 2006, the content of which is hereby incorporated herein by reference.

BACKGROUND OF THE INVENTION

This invention relates to improved electrodes for a membrane electrode assembly (MEA) for use in proton exchange membrane fuel cells (PEMFC) and direct methanol fuel cells (DMFC), and more particularly a method of manufacturing nanotubes formed from platinum (Pt) and platinum alloys, for example, platinum-palladium (PtPb). The present invention includes, but is not limited to, improved cathodic catalysts formed from such platinum nanotubes (PtNTs) and platinum-palladium nanotubes (PtPdNTs).

A fuel cell is a device that converts the chemical energy of a fuel and an oxidant directly into electricity without combustion. The principal components of a fuel cell include electrodes catalytically activated for the fuel (anode) and the oxidant (cathode), and an electrolyte to conduct ions between the two electrodes, thereby producing electricity. The fuel typically is hydrogen or methanol, and the oxidant typically is oxygen or air.

Fuel cells are electrochemical devices that convert chemical energy directly into electrical energy. Compared with internal combustion engines, fuel cells are not limited by the Carnot cycle and in principle could have higher efficiency. With pure hydrogen as the fuel, fuel cells are very environmentally friendly. The combination of high efficiency, low environmental impact, and high power density has been and will continue to be the driving force for vigorous research in this area for a wide variety of applications such as transportation, residential power generation, and portable electronic applications. For portable electronic applications, important features include high power density (i.e., longer battery life) and compactness.

Silicon-based microfabrication technology is amongst the promising approaches for fabrication of compact micro fuel cells. However, the current methods for making electrodes for fuel cells, which typically includes spraying and/or brushing of platinum supported on carbon powder, is incompatible with microfabrication techniques. Therefore, there is need for improved electrodes and methods of preparing such electrodes for PEMFCs and DMFCs.

Direct methanol fuel cells (DMFCs) have attracted enormous attention as a promising power source for portable electronics applications such as laptop computers and cell phones. The interest in commercializing DMFCs is in part due to the fuel cell's simple system design, high energy density and the relative ease with which methanol may be transported and stored, as compared with hydrogen. In the state-of-the-art DMFCs, platinum supported on a carbon substrate is configured in the cathode as a catalyst for activating the oxygen reduction reaction (ORR). A platinum-ruthenium alloy is usually used as the anode electrocatalyst, and may be supported on a carbon substrate. The electrolyte is usually a perfluorosulfonate membrane, for which NAFION (available from DuPont) is a commonly utilized commercially available membrane. One of the major problems encountered in DMFCs is methanol crossover from the anode to the cathode. The permeated methanol causes "poisoning" of the cathode platinum catalyst and depolarization losses due to the simultaneous oxygen reduction and methanol oxidation on the platinum catalyst.

Reference is made herein to the well-known rotating disk electrode (FIG. 28), which is used in the testing of the present invention as described below. As will be appreciated by those of ordinary skill in the art, the rotating disk electrode (RDE) consists of a disk on the end of an insulated shaft that is rotated at a controlled angular velocity. Providing the flow is laminar over all of the disk, the mathematical description of the flow is surprisingly simple, with the solution velocity towards the disk being a function of the distance from the surface, but independent of the radial position. The rotating disk electrode is used for studying electrochemical kinetics under conditions, such as those of testing the present invention, when the electrochemical electron transfer process is a limiting step rather than the diffusion process.

Polymer electrolyte based low temperature fuel cells, with their two best known variants, proton exchange membrane fuel cells (PEMFC) and direct methanol fuel cells (DMFC), have been considered promising for powering automobiles, homes, and portable electronics. Their successful commercialization is, however, very much dependent on the activity and durability of their electrocatalysts. At present, all pre-commercial low temperature fuel cells use supported Pt and Pt alloys as their electrocatalysts. The critical properties to consider when choosing an electrocatalyst support include its electrical conductivity, surface area, macro-morphology, microstructure, corrosion resistance, and cost. Carbon black (CB), such as Vulcan XC-72, has been the most widely used electrocatalyst support because of its reasonable balance among electronic conductivity, surface area, and cost. Recently, many nanostructured carbon materials with graphitic structure, such as nanotubes (CNTs), nanofibers (CNF) nanocoils, nanoarrays and nanoporous hollow spheres, have been studied. Among them, CNTs are of particular interest due to their unique electronic and micro and macro structural characteristics. CNTs have also been shown to be more corrosion-resistant than CB under simulated fuel cell operation conditions.

Among the two variants of low temperature fuel cells, DMFCs have been attracting great attention for powering small devices, such as laptop computers, cell phones, and personal digital assistants, because of their high energy density, ease of handling liquid fuel, and low operating temperature. However, the slow electrokinetics of the anode reaction—a methanol oxidation reaction—is still a key problem to the commercialization of DMFCs. Normally, expensive noble metal alloys, typically Pt—Ru, with a high electrode metal loading (e.g., >2.0 mg/cm$^2$) are employed in order to offer a reasonable fuel cell performance (e.g., 80 mW/cm$^2$ at cell temperature of 90° C. and O$_2$ pressure of two atmospheres). It has long been desired for a high performance anode catalyst to be developed so that the electrode metal loading and thus the cost of DMFCs can be reduced.

Some early investigations have found that, by simply replacing CB with CNTs in the conventional ink-paste electrode fabrication method, superior DMFC performance can be obtained. For example, a DMFC single cell with cup-stacked CNTs supported Pt—Ru anode catalyst showed nearly three times the maximum power density of a DMFC with CB (Vulcan XC-72) supported Pt—Ru anode catalyst, and it was suggested that CNTs can provide better charge and mass transfer.

Several types of carbon nanotubes may be used as electrocatalyic supports for low temperature fuel cells, for example, single-walled carbon nanotubes (SWNTs), multi-walled carbon nanotubes (MWNTs) and double-walled carbon nanotubes (DWNTs). SWNTs can have a large surface area (e.g., 500-1000 $m^2/g$) due to their small diameter (e.g., one nm), which is a favorable property as catalysts support. However, they normally contain a significant amount (e.g., two-thirds) of semiconducting tubes, which are poor electron conductors and thus are expected to be a poor electrocatalytic support. MWNTs are highly conducting, but they have limited surface area (e.g., 100-200 $m^2/g$) due to their large diameter (e.g., forty nm). It was recently shown that most DWNTs are conducting tubes and that they can have high surface areas (e.g., 500-1000 $m^2/g$). Thus a natural and logical choice for an electrocatalyst support is DWNTs.

The slow rate of the oxygen reduction reaction (ORR) in the polymer electrolyte membrane fuel cell (PEMFC) is the main limitation for automotive applications. It has been shown that the $Pt_3Ni(111)$ is 10-fold more active for the ORR than the corresponding Pt(111) surface and 90-fold more active than the current state-of-the-art Pt/C catalysts for PEMFC. The $Pt_3Ni(111)$ surface has an unusual electronic structure (d-band center position) and arrangement of surface atoms in the near-surface region. Under operating conditions relevant to fuel cells, its near-surface layer exhibits a highly structured compositional oscillation in the outermost and third layers are Pt rich and the second atomic layer is Ni rich. The weak interaction between the Pt surface atoms and non-reactive oxygenated species increases the number of active sites for $O_2$ adsorption.

The utilization of the PEM fuel cell in demanding application such as automobiles must be overcome the kinetic limitations on the oxygen reduction reaction (ORR), which have led to three fundamental problems. First, the significant overpotential for the oxygen reduction reaction, at practical operating current densities reduces the thermal efficiency well below the thermodynamic limits, typically about 43% at 0.7 V versus the theoretical thermal efficiency of 83% at the reversible potential for the ORR (1.23 V). Second, an approximately five-fold reduction of the amount of Pt (platinum-loading) in current PEMFC stacks is needed to meet cost requirements for large scale automotive applications. Finally, the dissolution and/or loss of Pt surface area in the cathode must be greatly reduced.

These limitations could be eliminated if stable cathode catalysts with an order of magnitude increase in the specific activity over state-of-the-art Pt/C catalysts can be developed. In the hope that a combination of different metals would have improved catalytic activity and stability relative to a pure metal, the ORR has been studied on numerous bi (or multi) metallic alloys. These studies have led to incremental improvements to catalyst performance, but large increases in activity have yet to be realized.

Considering that the $Pt_3Ni(111)$-skin surface exhibits the highest catalytic activity that has ever been detected, the challenge would be to create nanocatalyst with electronic and morphological properties that mimic the $Pt_3Ni(111)$ surface. In the future, therefore, a way to reduce the current specific power density in fuel cell (0.7 $g_{Pt}/kW$) without a loss in cell voltage, while maintaining the maximum power density (W/$cm^2$), would be engineering of PtNi(111)-skin like nanocatalysts.

Fuel cells, as devices for direct conversion of the chemical energy of a fuel into electricity by electrochemical reactions, are among the key enabling technologies for the transition to a hydrogen-based economy. Of several different types of fuel cells under development today, polymer electrolyte fuel cells (PEFCs) have been recognized as a potential future power source for zero-emission vehicles. However, to become commercially viable, PEFCs have to overcome the barrier of high catalyst cost caused by the exclusive use of platinum and platinum-based catalysts in the fuel-cell electrodes. Here we demonstrate a new class of low-cost (non-precious metal)/ (heteroatomic polymer) nanocomposite catalysts for the PEFC cathode, capable of combining high oxygen-reduction activity with good performance durability.

A schematic representation of the principle of fuel-cell operation is shown in FIGS. 1 and 2. PEFCs operate with a polymer electrolyte membrane that separates the fuel (hydrogen) from the oxidant (air or oxygen). Precious-metal catalysts, predominantly platinum (Pt) supported on carbon, are used for both the oxidation of the fuel and reduction of the oxygen in a typical temperature range of 80-100° C. Apart from the issue of the high cost of catalyst and other fuel-cell system components (polymer electrolyte membrane, bipolar plates, the rest of the power system, and so on), PEFCs suffer from insufficient performance durability, arising mainly from cathode catalyst oxidation, catalyst migration, loss of electrode active surface area, and corrosion of the carbon support. In a direct methanol fuel cell (DMFC), the Pt cathode also endures a performance loss resulting from the lack of tolerance to methanol diffusing through the membrane from the anode side of the cell. Thus, whether using hydrogen or methanol as a fuel, PEFCs are in need of efficient, durable and, most importantly, inexpensive catalysts, as alternatives to Pt and Pt-based materials. Although ideally the Pt catalyst should be replaced at both fuel-cell electrodes, the substitution of the cathode catalyst with a non-precious material is likely to result in significantly greater reduction of Pt needed for PEFCs. This is because the slow oxygen reduction reaction (ORR) at the cathode requires much more Pt catalyst than the very fast hydrogen oxidation at the anode.

Two approaches are at present gaining momentum to replace Pt, which is scarce (only 37 p.p.b. in the Earth's crust) and expensive (~US$45 $g^{-1}$, the highest Pt price in 25 years). One approach uses non-Pt catalysts that nonetheless contain precious metals with limited abundance and/or limited world distribution. Such catalysts are typically based on palladium (Pd) or ruthenium (Ru). Although Pt is thus avoided, the result is the replacement of one precious metal with another that is on the whole less active than Pt. An alternative approach is to replace Pt with abundant, non-precious materials that are not susceptible to price inflation under high-demand circumstances. There has been demonstrated a new non-precious composite catalyst from an entirely new class of (non-precious metal)/(heterocyclic polymer) composite materials, synthesized via a pyrolysis-free process. As shown with the Co—PPY—C composite, such catalysts promise to deliver high ORR activity without any noticeable loss in performance over long fuel-cell operating times. This therefore opens up the possibility of making a variety of other non-precious composite materials from this class of composites for use as catalysts for the PEFC cathode.

Fuel cells are expected to become a major source of clean energy with particularly important applications in transportation. Despite considerable recent advances, existing fuel-cell technology still has drawbacks, including the instability of the platinum electrocatalyst for the ORR at the cathode. Recent work recorded a substantial loss of the Pt surface area over time in proton-exchange membrane fuel cells (PEMFCs) during the stop-and-go driving of an electric car; this depletion exceeded the Pt dissolution rates observed upon holding at constant potentials for extended time spans. The reported study results suggest possibilities toward resolving this impediment and for synthesizing improved ORR Pt-based and for stabilizing Pt and other Pt-group metals under oxidizing conditions.

Accordingly, there is a need for, and what was heretofore unavailable, an improved membrane electrode assembly incorporating electrocatalysts formed from platinum and platinum based alloy materials having increased durability and decreased costs. The present invention satisfies these and other needs

SUMMARY OF THE INVENTION

The present invention is directed to catalysts, electrodes and membrane electrode assemblies suitable for use in proton exchange membrane fuel cells (PEMFC—FIG. 1) and direct methanol fuel cells (DMFC—FIG. 2). Fuel cells bring the promise of clean electrical energy generation with high efficiency. The polymer electrolyte fuel cell operating at relatively low temperature (typically from −20 to 140° C.) with hydrogen (proton exchange membrane fuel cell, PEMFC) and liquid methanol feed (direct methanol fuel cell, DMFC) is particularly promising for portable power, back-up power, motive power, and stationary power generation. Considerable technical challenges still remain. The most significant of these challenges are low activity, poor utilization and durability of the anode and cathode catalysts. The best known catalysts now are platinum (Pt) and platinum based alloy nanoparticles supported on carbon materials (mesoporous carbons, carbon nanotubes, and graphitic carbon nanofibers).

The present invention provides a proton exchange membrane fuel cell with nanostructured components, in particular, the electrodes. The nanostructured fuel cell has a higher precious metal utilization rate at the electrodes, higher power density (kW/volume and kW/mass), and lower cost. The nanostructured fuel cells are not only attractive for stationary and mobile applications, but also for use as a compact power supply for microelectronics such as laptops, cell phones and other electronic gadgets. In accordance with one embodiments of the present invention, aligned (oriented) arrays of platinum and platinum alloy nanotubes are used for forming electrocatalysts.

Electrocatalyst durability has been recently recognized as one of the most important issues that have to be addressed before the commercialization of the proton exchange membrane fuel cells (PEMFCs). The common catalyst used in proton exchange membrane fuel cells incorporates carbon black as a support structure (FIG. 3). However, carbon black does not provide sufficient simultaneous access of gas, proton, and electron. In addition, membrane electrode assemblies (MEA) using carbon black provide low platinum utilization (20-30%), a dense catalyst layer, low catalyst activity and are difficult mass transport.

The present invention is directed to a new class of cathode catalysts based on supportless platinum nanotubes (PtNTs) and platinum alloy nanotubes, for example, platinum-palladium nanotubes (PtPdNTs), that have remarkable durability and high catalytic activity. Due to their unique combination of dimensions at multiple length scales, the platinum nanotubes of the present invention can provide high platinum surface area due to their nanometer-sized wall thickness, and have the potential to eliminate or alleviate most of the degradation pathways of the commercial carbon supported platinum catalyst (Pt/C) and unsupported platinum-black (PtB) as a result of their micrometer-sized length. The platinum nanotube catalysts of the present invention asymptotically approach a maximum of about twenty percent platinum surface area loss in durability test, while the commercial PtB and Pt/C catalysts lose about fifty-one percent and ninety percent of their initial surface area, respectively. Moreover, the PtNT and PtPdNT catalysts of the present invention show higher mass activity and much higher specific activity than commercial Pt/C and PtB catalysts.

The present invention includes the production of platinum and platinum based alloy nanotubes (5 to 100 nm diameter, 0.1 to 100 μm long and 1-10 nm wall thickness) as catalysts for PEMFC and DMFC that have the following advantages compared with conventional catalysts:

(1) No support oxidation problems at high potentials, start-stop, fuel starvation, because Pt and Pt based alloy nanotubes can be used as catalysts for fuel cells directly without any support;
(2) Negligible mass transfer overpotential at high current densities because of the much thinner catalyst layer (e.g., <500 nm) in the membrane electrode assembly (MEA);
(3) Higher stability against Pt dissolution/agglomeration at high voltages, start-stop, etc. because the macro-size of the length of the tube;
(4) Higher mass activity;
(5) Higher utilization (e.g., 100%) in the electrode—at all current densities;
(6) High electrochemical surface area; and
(7) Tubular morphology of Pt and Pt based alloy nanotubes enhances charge and mass transportation in the electrodes.

The synthesis of platinum and platinum based alloy nanotubes may be achieved using silver nanowires. The process of the present invention includes a galvanic displacement reaction that occurs as a solution containing a platinum precursor is in contact with a silver nanowire. The elemental platinum should be mainly confined to the vicinity of the template surface. Once the concentration of platinum atoms has reached a critical value, they will nucleate and grow into small cluster, and eventually evolve into a shell-like structure around the template (a silver nanowire). This reaction is believed to initiate on the facets with the highest surface energy and then proceed to those with lower energies. As a result, the thin shell formed in the early stage is incomplete, and thus it is possible for Pt(II) and Ag(I) ion to diffuse across this layer until the template has been completely consumed. Note that as the platinum deposition goes on, the silver is oxidized and the platinum produced has a 2:1 ratio, which leads to a gap between the platinum tube and the shrinking silver wire. Thus, transport of mass from the side of the tube is also possible. Eventually, the openings in the wall of the platinum shell will be closed to form a seamless platinum shell.

Similarly, the synthesis of platinum and platinum based alloy nanotubes may be achieved using selenium nanowires. The process of the present invention includes conformal coating of selenium templates with platinum and may occur via two distinct reduction reactions: (i) the initial reduction of the Pt(II) salt by a selenium template at the Pt—Se interface, and (ii) the reduction of the Pt(II) salt by an alcohol solvent.

The synthesis of platinum and platinum based alloy nanotubes may also be achieved by a surfactant method of the present invention. In this mechanism, the rodlike micelles of $C_{12}EO_9$ molecules in an aqueous medium are combined with much larger-sized sorbitan-based non-ionic surfactant molecules to form an aqueous solution of the mixed surfactant cylindrical micelles. On cooling the mixed micellar solution may be converted into a hexagonal LC. At the final stage, the platinum species confined to the aqueous region of the molecular assemblies are reduced into platinum atoms so as to form the nanotubes.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Electrocatalyst durability has been recently recognized as one of the most important issues that have to be addressed before the commercialization of the proton exchange membrane fuel cells (PEMFCs). The durability problem is particularly severe in the cathode where the oxygen reduction reaction (ORR) occurs. At present, the most widely used cathode catalyst system is platinum (Pt) in the form of small nanoparticles two to five nanometers (nm) supported on amorphous carbon particle aggregates (Pt/C). The poor durability of the Pt/C catalyst is reflected by a fast and significant loss of platinum electrochemical surface area (ECSA) over time during fuel cell operation. The mechanisms for the loss of platinum ECSA at the cathode have been discussed and can be summarized as follows: (i) loss of platinum nanoparticles from the electrical contact due to the carbon support corrosion, (ii) platinum dissolution and re-deposition or Ostwald ripening of the platinum nanoparticles, (iii) platinum nanoparticle aggregation driven by surface energy minimization, (iv) Pt nanoparticle dissolution followed by migration of the soluble $Pt^{2+}$ species within the polymer electrolyte and the eventual chemical reduction by cross-over hydrogen.

Figure 5:
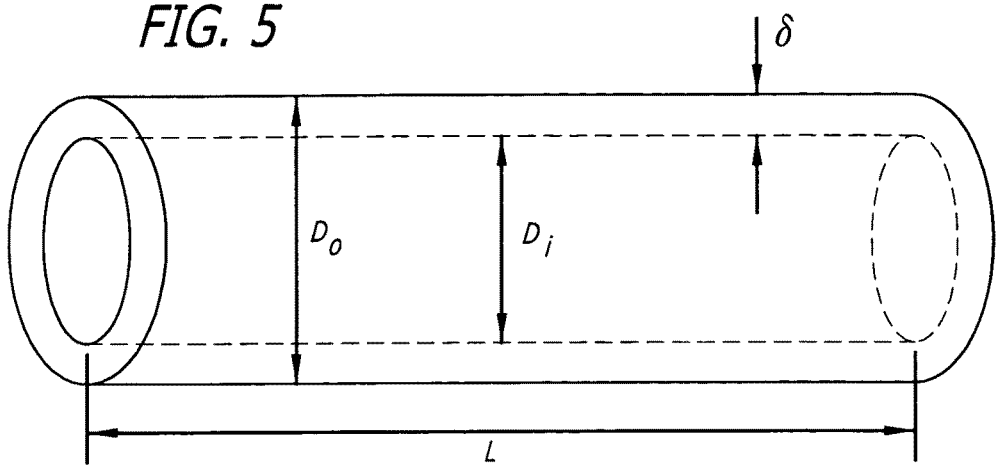
FIG. 5 is a schematic of a platinum nanotube.
Figure 6:
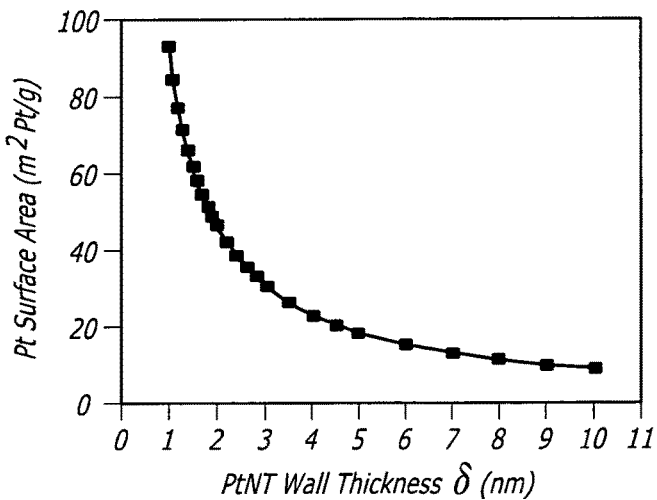
FIG. 6 depicts a graph of the theoretical surface area of a platinum nanotube versus the wall thickness of the platinum nanotube.
Figure 7:
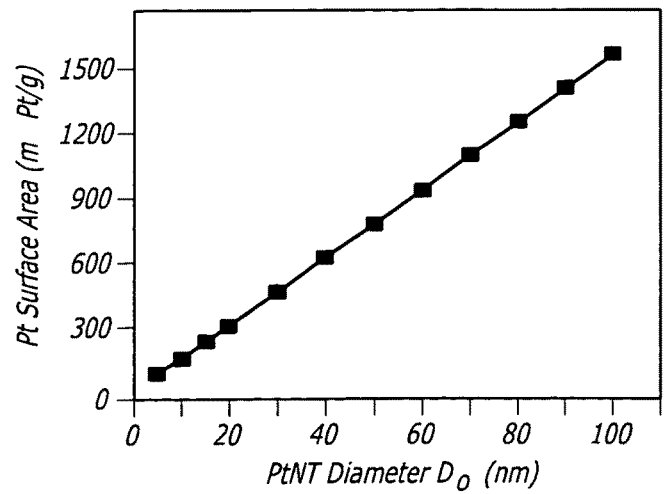
FIG. 7 depicts a graph of the theoretical catalyst layer thickness versus the outside diameter of a platinum nanotube, assuming close-packed platinum nanotubes.

The carbon corrosion problem can be alleviated by the use of a more corrosion-resistant catalyst support, for example, graphitized carbons and carbon nanotubes. No effective solutions, however, exist for addressing the other three mechanisms. The present invention provides a durable electrocatalyst by developing supportless platinum nanotubes (PtNTs) and platinum alloy nanotubes, for example, but is not limited to, platinum-palladium nanotubes (PtPdNTs) as the cathode catalyst. Due to their unique combination of dimensions at multiple length scales, PtNTs and PtPdNTs can provide high platinum surface area without the need of a high surface area support (for example, carbon black) by their nanometer-sized wall thickness (see FIGS. 5 and 6). In addition, PtNTs and PtPdNTs can have the potential to eliminate or significantly reduce all of the four degradation pathways discussed above as a result of their micrometer-sized length. First, PtNTs do not require a support, and thus the support corrosion problem is eliminated. Second, the micrometer-sized (µm) length of the PtNTs (1-D nanostructure) makes the PtNTs less vulnerable, than the Pt nanoparticles (0-D nanostructure), to dissolution, the Ostwald ripening, and aggregation during the fuel cell operation. Additionally, the PtNTs and PtPdNTs, like carbon nanotubes (CNTs), have an anisotropic morphology that can improve the mass transport and catalyst utilization. And if properly assembled in a catalyst layer (for example, cubic or hexagonal close-packing and vertically aligned on the Nafion membrane), they can also lead to a thin catalyst layer (for example, 0.5 µm at a PtNT wall thickness of two nanometers and a platinum loading of 0.2 mg/cm$^2$) (FIG. 7), further improving the mass transfer characteristics within the catalyst layer.

The present invention includes synthesized platinum nanotubes (PtNTs) and platinum-palladium alloy nanotubes (PtPdNTs) having about fifty nanometers in diameter and about five to twenty µm long, with about five to eight nanometer wall thickness. The synthesized nanotubes were tested for their suitability as catalysts for ORR in PEMFCs. PtNTs were synthesized by galvanic replacement reaction of silver (Ag) nanowires (AgNWs) developed by known methods. The AgNWs were synthesized using a polyol method, and then refluxed with $Pt(CH_3COO)_2$ in an aqueous solution. After acid and heat treatment, the platinum nanotube product was collected by centrifugation.

Figure 1:
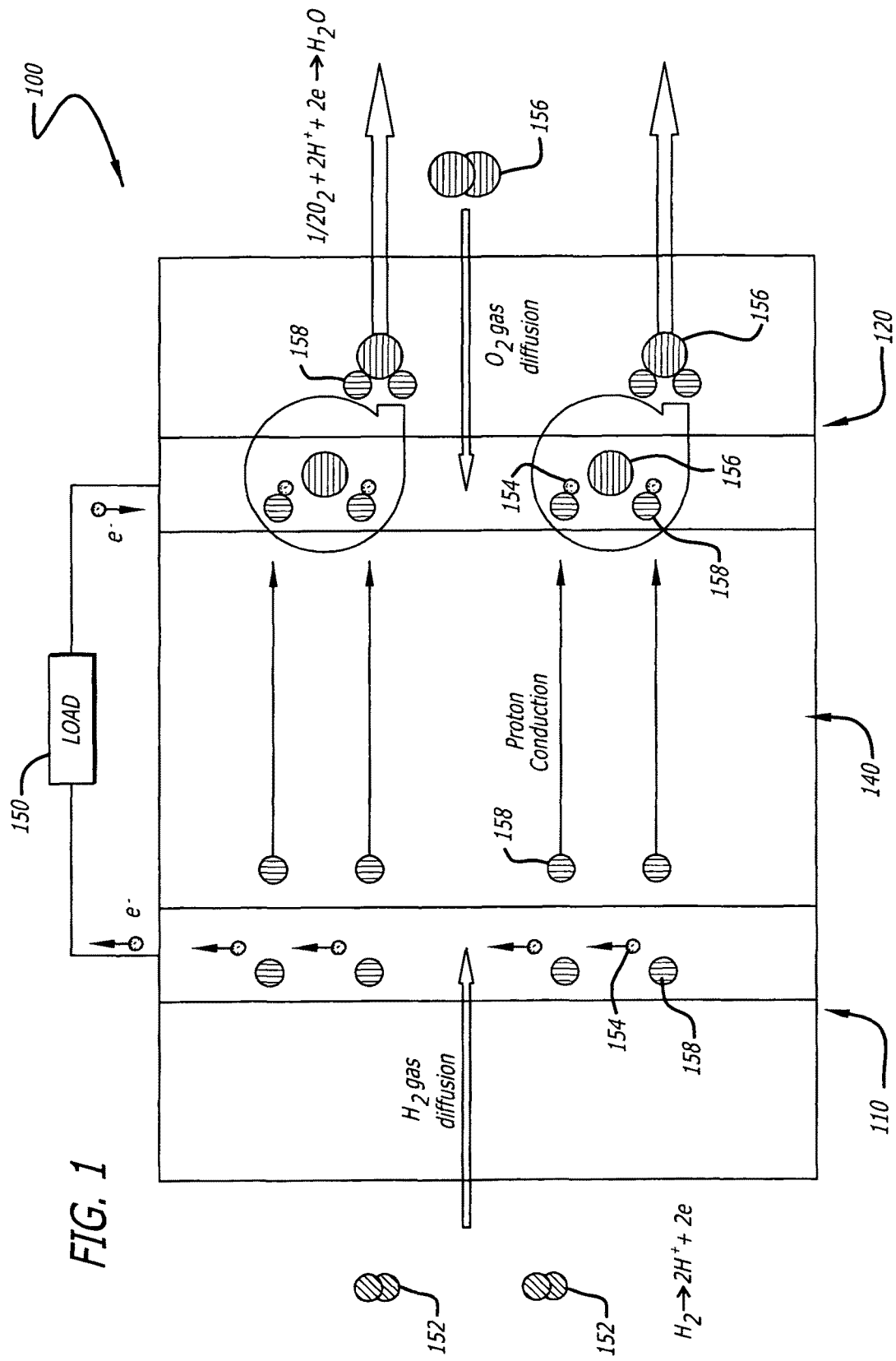
FIG. 1 depicts a schematic diagram of a membrane electrode assembly for a proton exchange membrane fuel cell.

Turning now to the drawings, in which like reference numerals represent like or corresponding elements in the drawings, and in particular to FIG. 1, a PEMFC 100 consists of an anode 110, a cathode 120, and a proton exchange membrane (PEM) 140. The assembly of these three components is usually called a membrane electrode assembly (MEA). If pure hydrogen ($H_2$) 152 is used as fuel, hydrogen is oxidized in the anode and oxygen ($O_2$) 156 is reduced in the cathode. The protons 158 and electrons 154 produced in the anode are transported to the cathode through the proton exchange membrane and external conductive circuit having a load 150, respectively. Water ($H_2O$) is produced on the cathode as a result of the combination of protons and oxygen. In order to make the catalyst accessible by reactant gases, a hydrophobic diffusion layer consisting of carbon particles and polytetrafluoroethylene (PTFE) is usually used to manage the water content around the catalyst layer.

Figure 2:
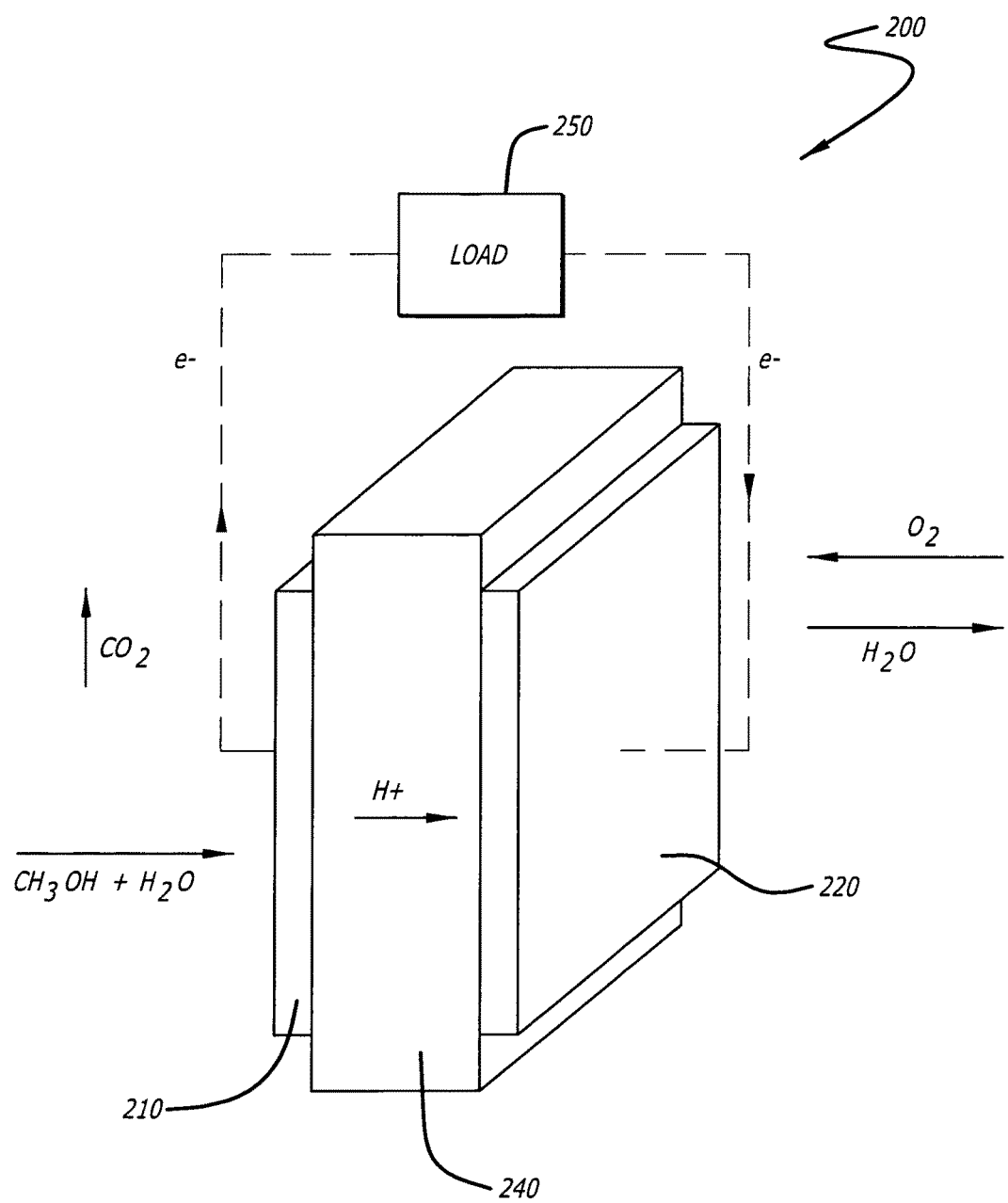
FIG. 2 depicts a schematic of a membrane electrode assembly for a direct methanol fuel cell.

Referring to FIG. 2, a direct methanol fuel cell 200 of the present invention includes an anode 210, cathode 220 and a polymer electrolyte membrane (PEM) 240 positioned between the anode and cathode. A methanol ($CH_3OH$) in water ($H_2O$) solution is introduced at the anode, which releases carbon dioxide ($CO_2$) during methanol oxidation catalyzed by platinum (or other material) contained in the anode. Air or oxygen ($O_2$) is introduced at the cathode, and water is formed during oxygen reduction (catalyzed by platinum or other material) as protons ($H^+$) move across the membrane. A load 250 connected across the anode and cathode completes the electric circuit formed by electrons ($e^-$) released during methanol oxidation.

Figure 3:
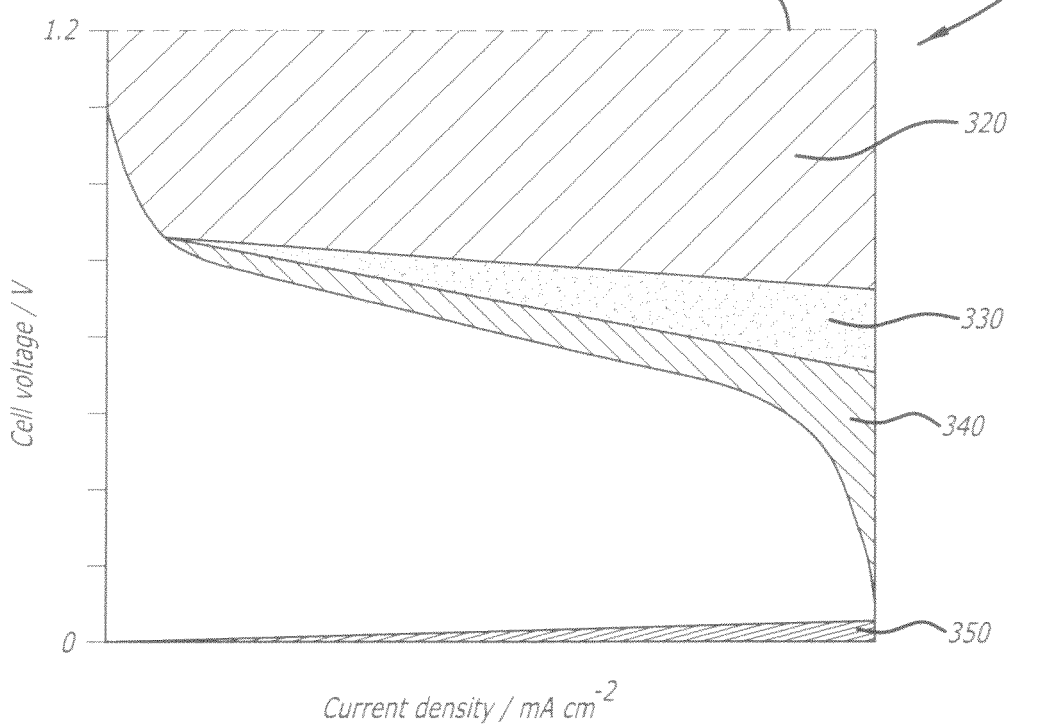
FIG. 3 is a typical fuel cell ($H_2$) polarization curve.

As shown in FIG. 3, a fuel cell polarization curve (I-V) 310 has an uppermost horizontal theoretical curve 310 with certain associated loses in efficiency. For example, there is a significant cathode kinetic loss 320 and a somewhat smaller anode kinetic loss 350. In addition, there is an internal resistance loss 330 and a mass transport loss 340. PEMFCs also exhibit a significant cathode over-potential loss, while DMFCs exhibit significant anode over-potential loss.

Figure 4:
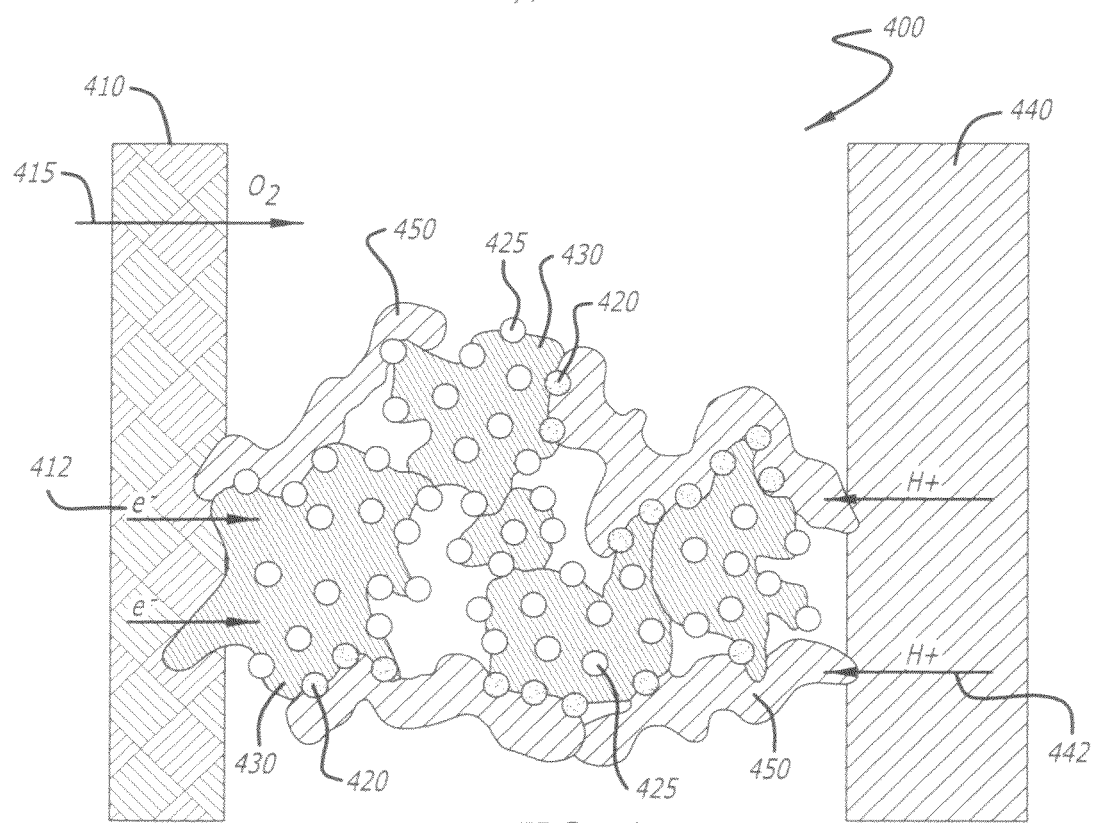
FIG. 4 is a schematic diagram of a catalyst having platinum disposed on carbon black and NAFION polymer electrolyte.

Referring to FIG. 4, the most commonly used electrode catalyst 400 is platinum 420, 425 supported on carbon fibers 410. One of the challenges in the commercialization of PEMFCs and DMFCs is the high cost of noble metals used as catalyst (for example, platinum and its alloys). Decreasing the amount of platinum and its alloys used in a fuel cell electrode via the increase of the utilization efficiency of platinum has been one of the major concerns during the past decade. To effectively utilize the platinum catalyst, the platinum should have simultaneous access to the gas, the electron-conducting medium, and the proton-conducting medium. In the catalyst layer of a platinum-based conventional fuel cell prepared by the ink-process, the simultaneous access of the platinum particle 420 by the electron-conducting medium and the proton-conducting medium is achieved via a skillful blending of platinum supporting carbon black particles 430 and the solubilized perfluorosulfonate ionomer (for example NAFION) 450. The carbon particles conduct electrons and the perfluorosulfonate ionomer (for example, NAFION) conduct protons.

Even with the most advanced conventional electrodes, there is still a significant portion of platinum 425 that is isolated from the external circuit and/or the proton exchange membrane (PEM) 440, resulting in a low platinum utilization. For example, platinum utilization in current commercially offered prototype fuel cells remains very low (20-30%) although higher utilization has been achieved in laboratory devices. Efforts directed at improving the utilization efficiency of the platinum catalyst have focused on finding the optimum material configurations while minimizing the platinum loading and satisfying the requirements of gas access, proton access, and electronic continuity. In the conventional ink-process, a common problem has been that the necessary addition of the solubilized perfluorosulfonate ionomer (e.g., NAFION from Ion Power, Inc.) for proton transport tends to isolate carbon particles in the catalyst layer, leading to poor electron transport.

Due to their unique structural, mechanical, and electrical properties, carbon nanotubes may be used to replace traditional carbon powders in PEMFCs and have been demonstrated by making membrane electrode assemblies (MEA) using carbon nanotube powders through a conventional ink process. The use of carbon nanotubes and the resulting guaranteed electronic pathway eliminate the previously mentioned problem with conventional PEMFC strategies where the proton-conducting medium (e.g., NAFION) would isolate the carbon particles in the electrode layer. Eliminating the isolation of the carbon particles supporting the electrode layer improves the utilization rate of platinum.

Figure 8:
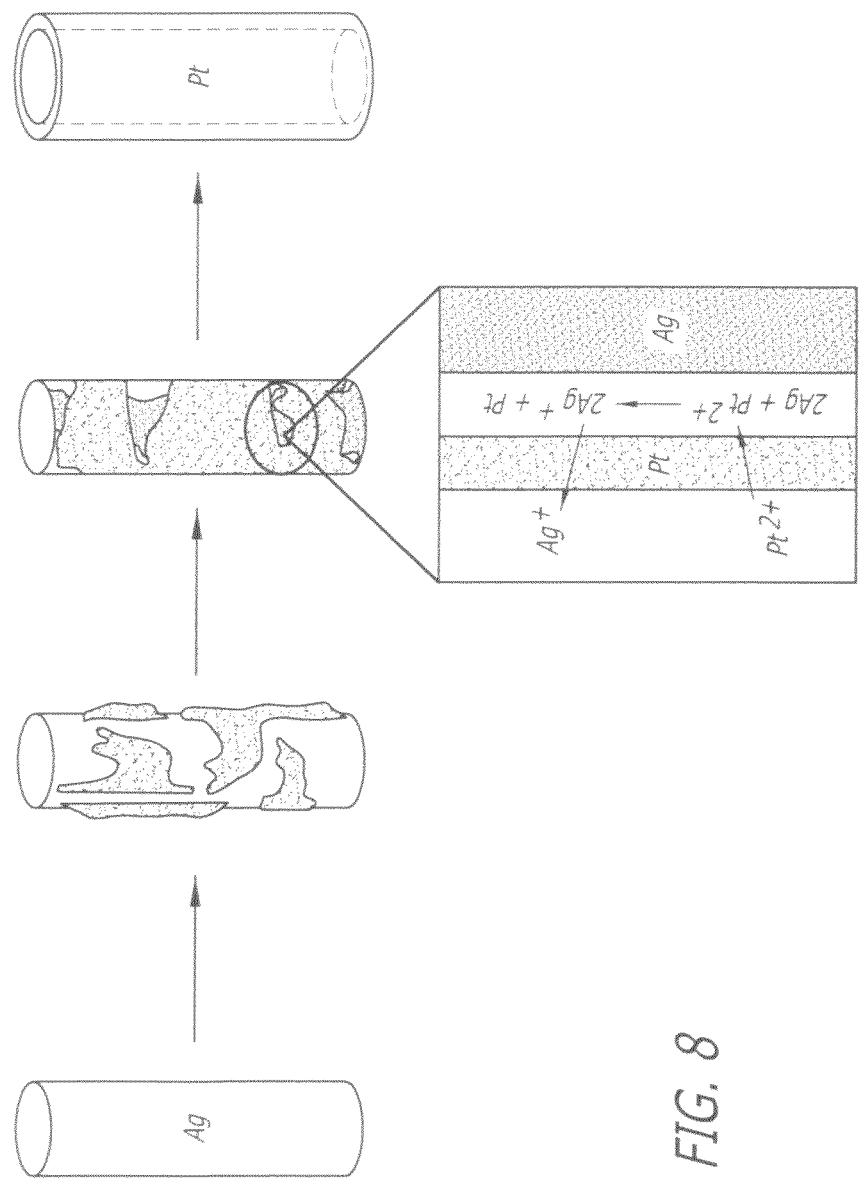
FIG. 8 is a schematic of a method for formation of a platinum nanotube from a silver nanowire according to the present invention.

As shown in FIG. 8, the synthesis of platinum and platinum based alloy nanotubes may be achieved using silver nanowires. As further described in the examples herein, the process of the present invention includes a galvanic displacement reaction that occurs as a solution containing a platinum precursor is in contact with a silver nanowire. The elemental platinum should be mainly confined to the vicinity of the template surface. Once the concentration of platinum atoms has reached a critical value, they will nucleate and grow into small cluster, and eventually evolve into a shell-like structure around the template (a silver nanowire). This reaction is believed to initiate on the facets with the highest surface energy and then proceed to those with lower energies. As a result, the thin shell formed in the early stage is incomplete, and thus it is possible for Pt(II) and Ag(I) ion to diffuse across this layer until the template has been completely consumed. Note that as the platinum deposition goes on, the silver is oxidized and the platinum produced has a 2:1 ratio, which leads to a gap between the platinum tube and the shrinking silver wire. Thus, transport of mass from the side of the tube is also possible. Eventually, the openings in the wall of the platinum shell will be closed to form a seamless platinum shell.

Figure 9:
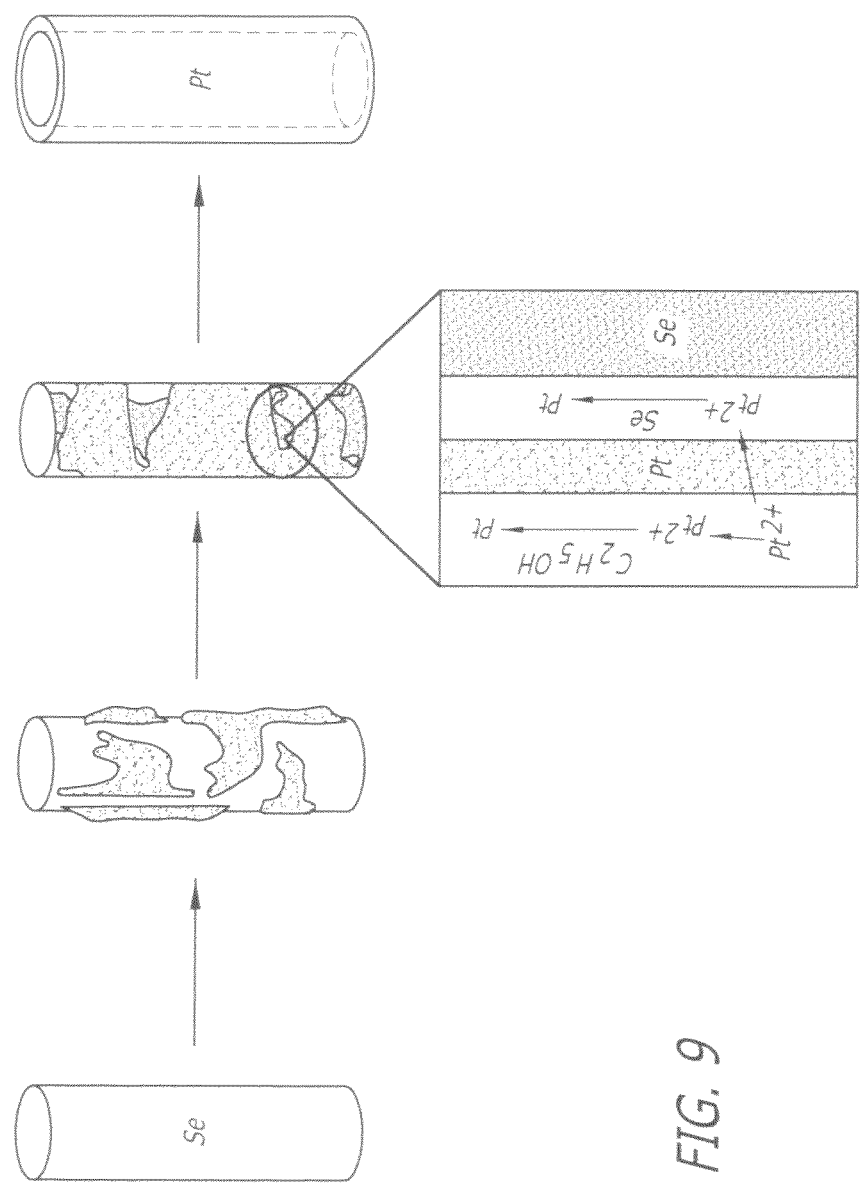
FIG. 9 is a schematic of a method for formation of a platinum nanotube from a selenium nanowire according to the present invention.

As shown in FIG. 9, the synthesis of platinum and platinum based alloy nanotubes may be achieved using selenium nanowires. As further described in the examples herein, the process of the present invention includes conformal coating of selenium templates with platinum and may occur via two distinct reduction reactions: (i) the initial reduction of the Pt(II) salt by a selenium template at the Pt—Se interface, and (ii) the reduction of the Pt(II) salt by an alcohol solvent.

Figure 10:
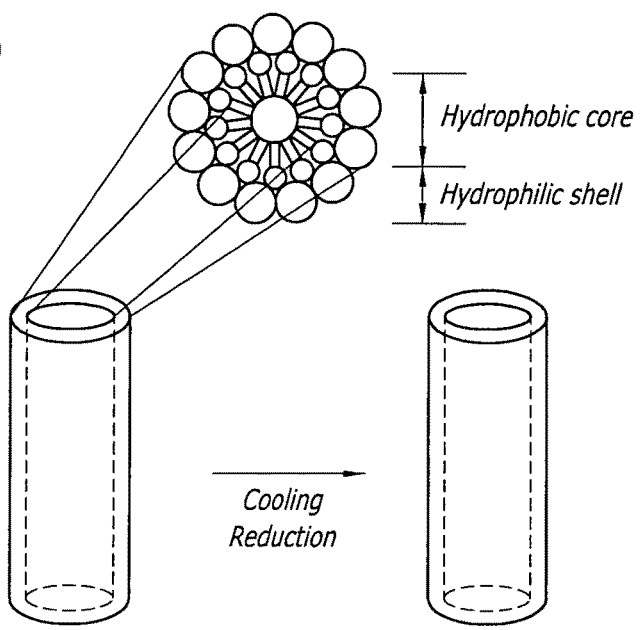
FIG. 10 is a schematic of a method for formation of a platinum nanotube using a surfactant method according to the present invention.

As shown in FIG. 10, the synthesis of platinum and platinum based alloy nanotubes may also be achieved by a surfactant method of the present invention. In this mechanism as further described in the examples herein, the rodlike micelles of $C_{12}EO_9$ molecules in an aqueous medium are combined with much larger-sized sorbitan-based non-ionic surfactant molecules to form an aqueous solution of the mixed surfactant cylindrical micelles. On cooling the mixed micellar solution may be converted into a hexagonal LC. At the final stage, the platinum species confined to the aqueous region of the molecular assemblies are reduced into platinum atoms so as to form the nanotubes.

Figure 11:
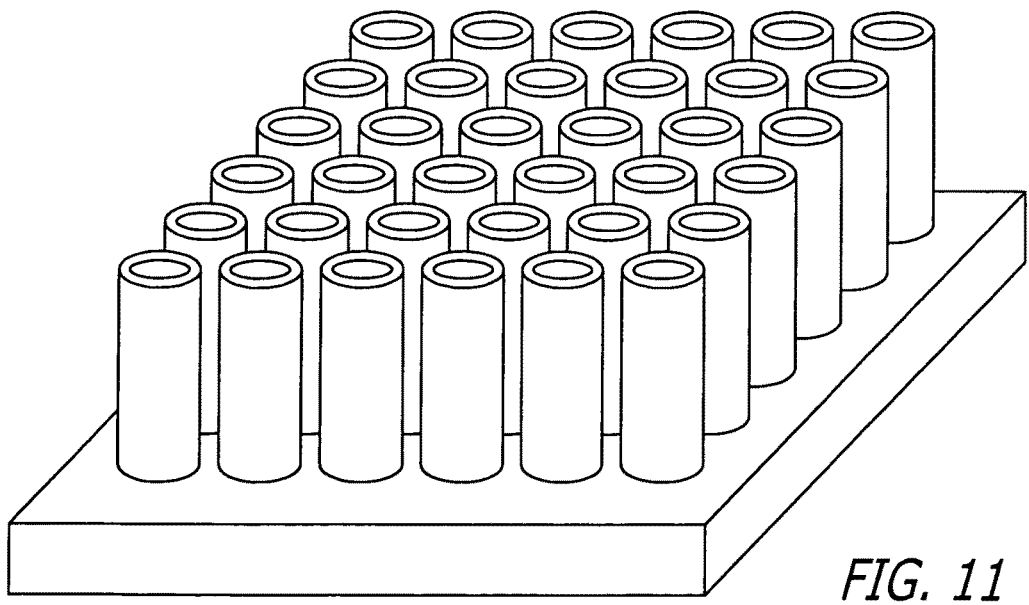
FIG. 11 is a schematic representation of platinum or platinum based alloy material transfer system aligned vertically on a substrate.
Figure 12:
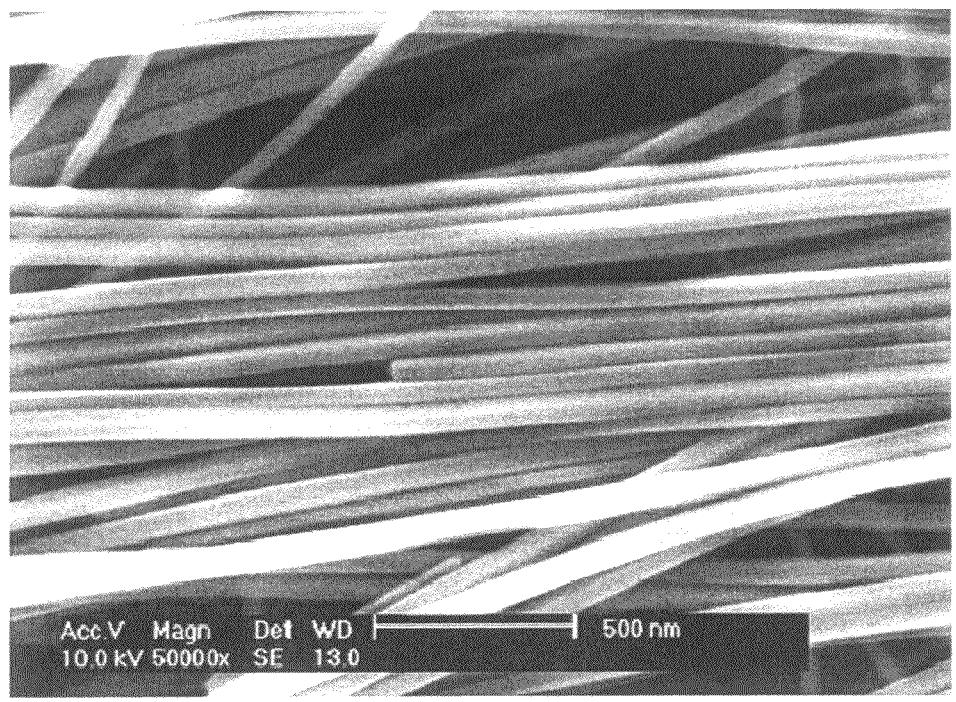
FIG. 12 is a SEM image showing the diameter of silver nanowires.
Figure 13:
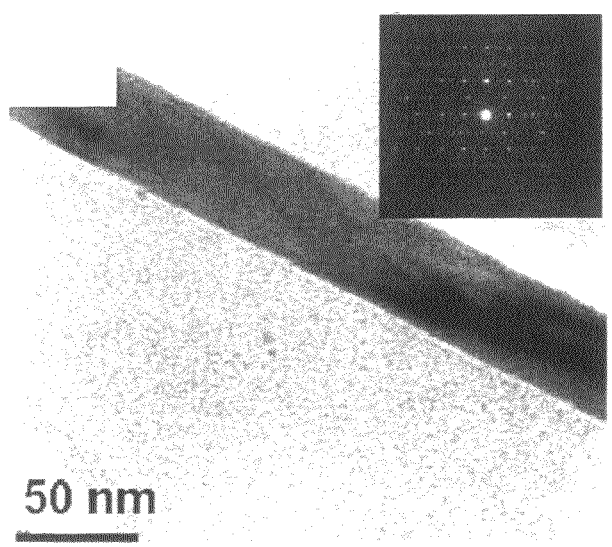
FIG. 13 is a TEM image and an electron diffraction pattern (inset) showing the diameter of silver nanowires (AgNWs).
Figure 14:
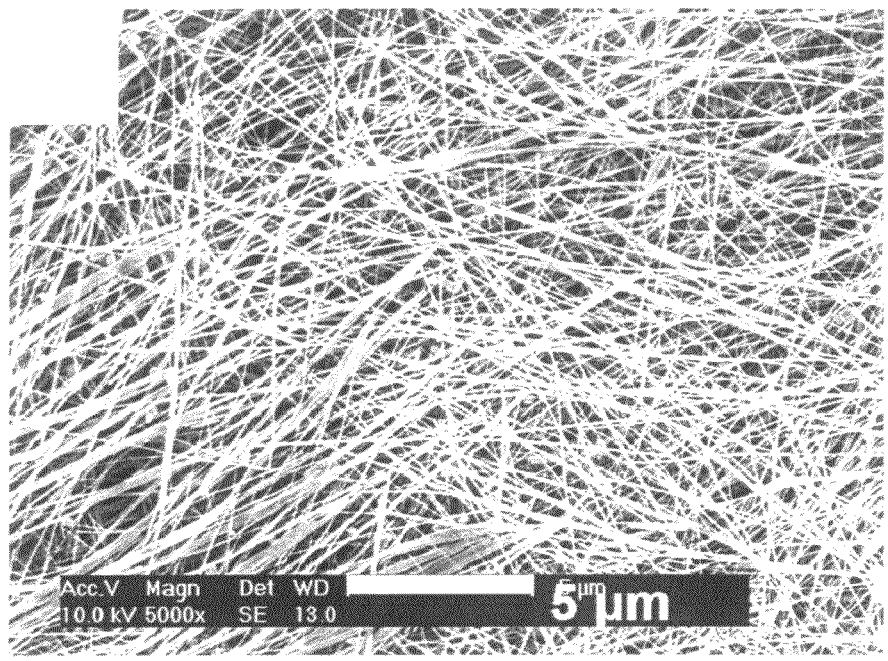
FIG. 14 is a SEM image showing the length of silver nanowires.
Figure 15:
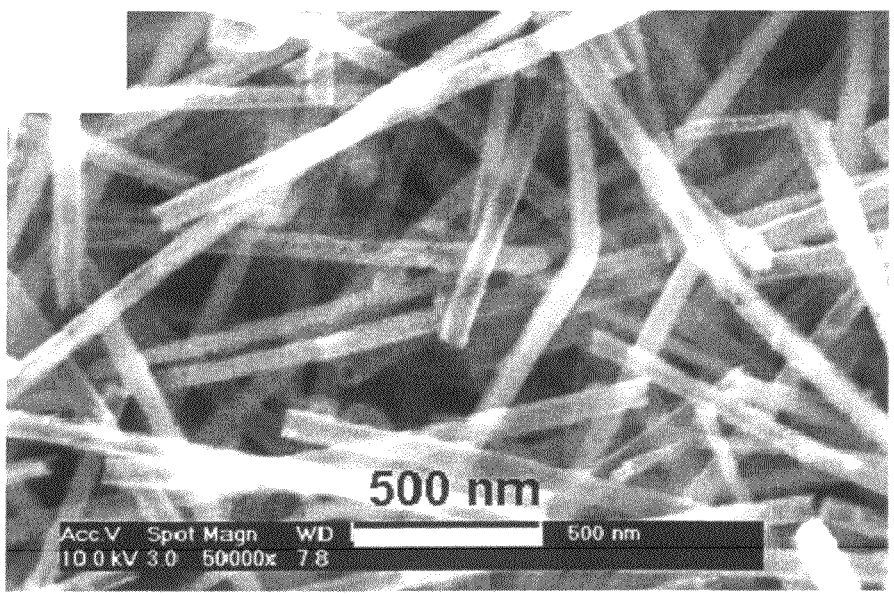
FIG. 15 is a SEM image showing the diameter of platinum nanotubes made from silver nanowires according to the present invention.
Figure 16:
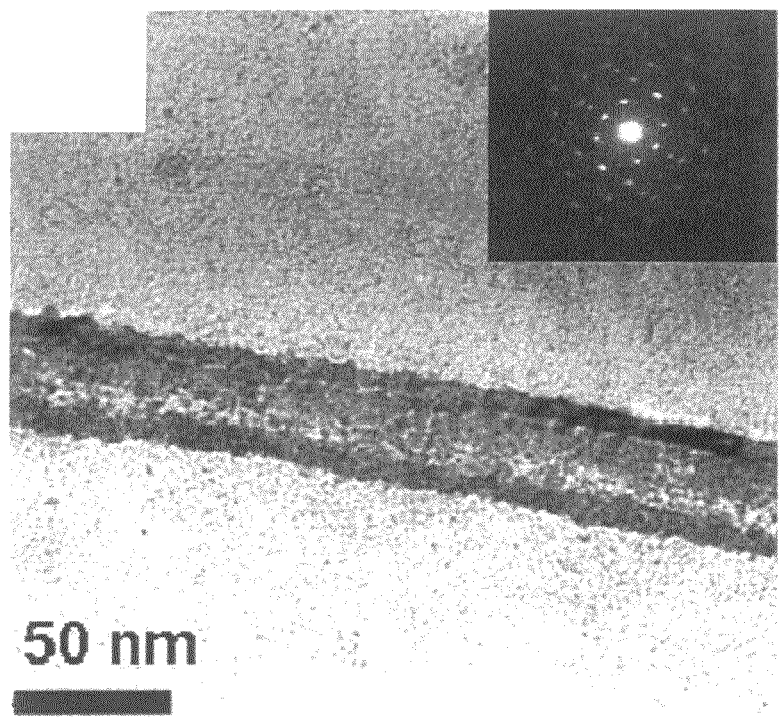
FIG. 16 is a TEM image and an electron diffraction pattern (inset) showing the diameter of a platinum nanotube made from a silver nanowire according to the present invention.
Figure 17:
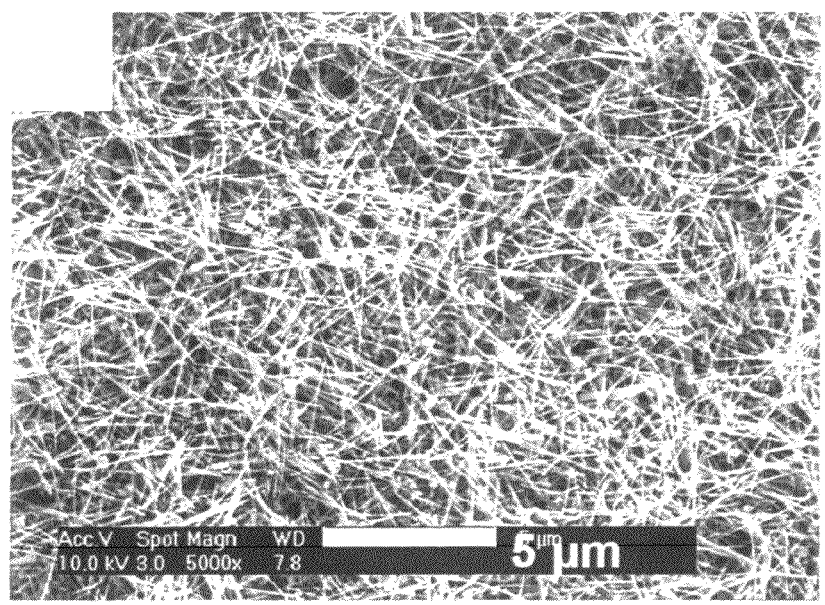
FIG. 17 is a SEM image showing the length of platinum nanotubes made from silver nanowires according to the present invention.
Figure 18:
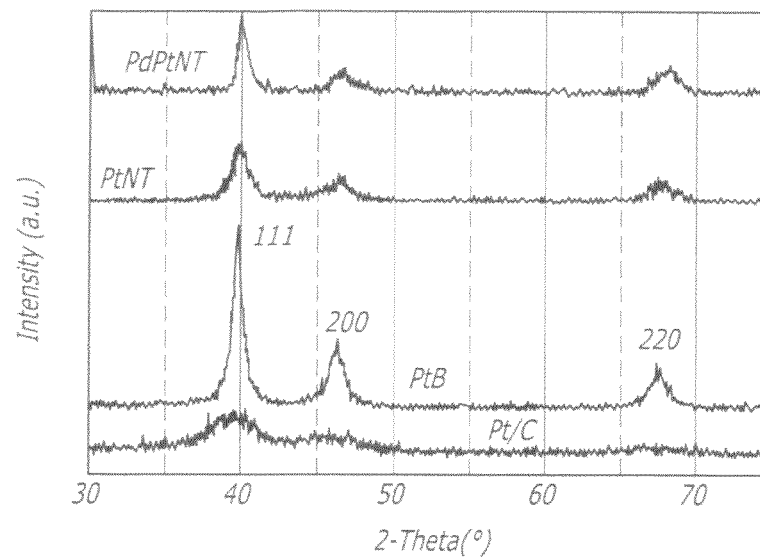
FIG. 18 is a graphical representation of X-ray diffraction (XRD) patterns of Pt/C, PtB, PtNTs and PtPdNTs.
Figure 19:
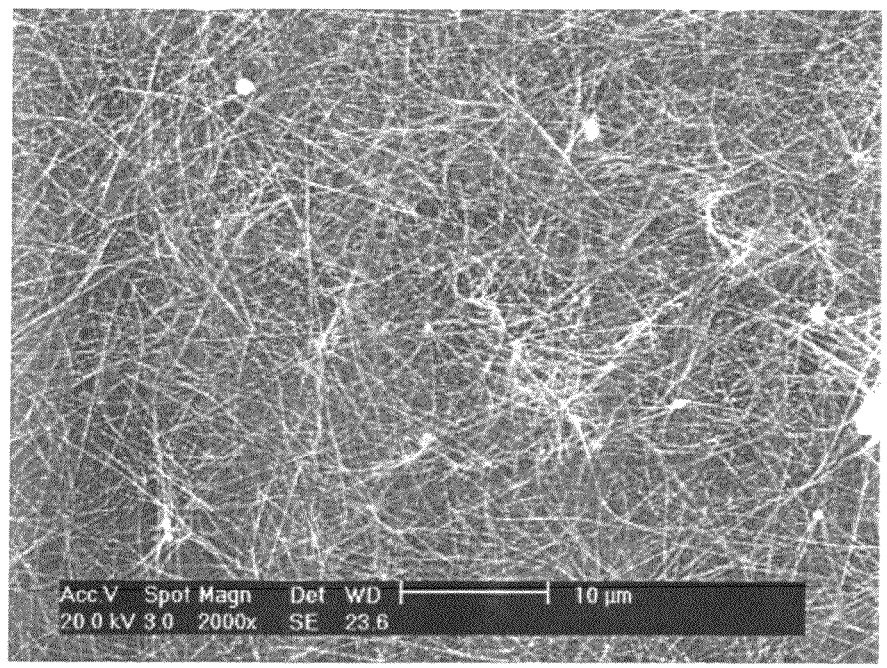
FIG. 19 is a SEM image showing the length of selenium nanowires.
Figure 20:
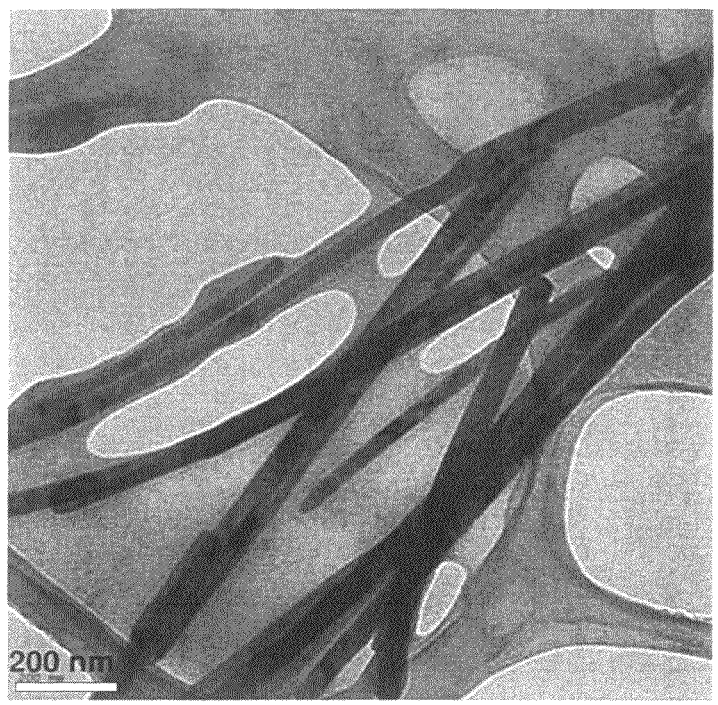
FIG. 20 is a TEM image showing the diameter of selenium nanowires.
Figure 21:
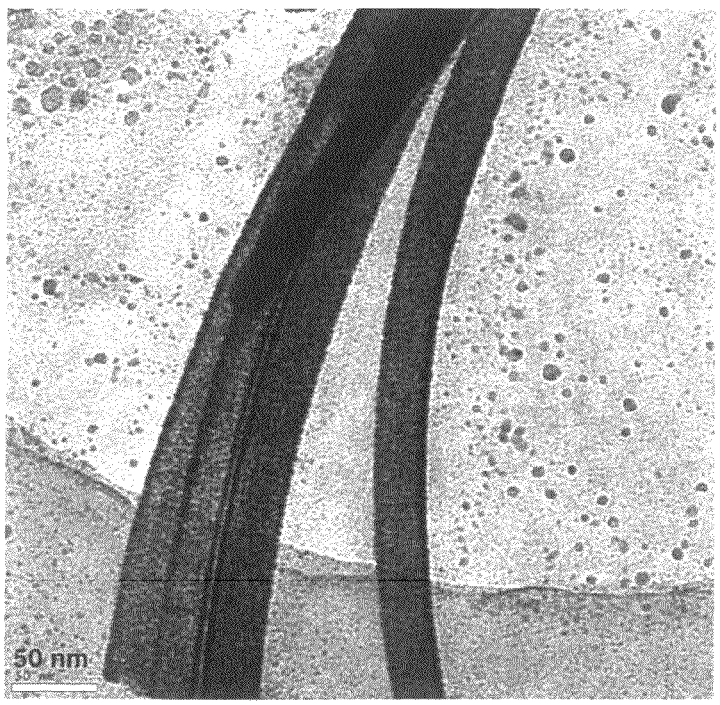
FIG. 21 is a SEM image showing the diameter of platinum nanotubes formed from selenium nanowires according to the present invention.

As shown in FIG. 11, the platinum or platinum based alloy nanotubes may be vertically aligned on a substrate as is known to one having ordinary skill in the art. The diameter (FIGS. 12 and 13) and length (FIG. 14) of AgNWs are about forty nanometers and ten μm, respectively. The electron diffraction pattern (FIG. 13 inset) shows the AgNWs have a multiple-twinned structure. The diameter, wall thickness (FIGS. 15 and 16), and length (FIG. 17) of PtNTs are about forty nanometers, six nanometers and ten μm, respectively. The electron diffraction pattern (FIG. 16 inset) of the PtNTs indicates that the walls of the tubes are made of Pt nanocrystallites. X-ray diffraction patterns (XRD) (FIG. 18) show that PtNTs and PtPdNTs have been formed successfully. The face centered cubic (fcc) lattice parameters of Pt/C, PtB and PtNTs and PtPdNTs are 0.3927, 0.3926, 0.3924 and 0.3897 nm, respectively. The SEM and TEM depicting length and diameter for selenium nanowires are shown in FIGS. 19 and 20, respectively. The TEM depicting the diameter of platinum nanotubes formed from selenium nanowires is shown in FIG. 21.

Figure 22:
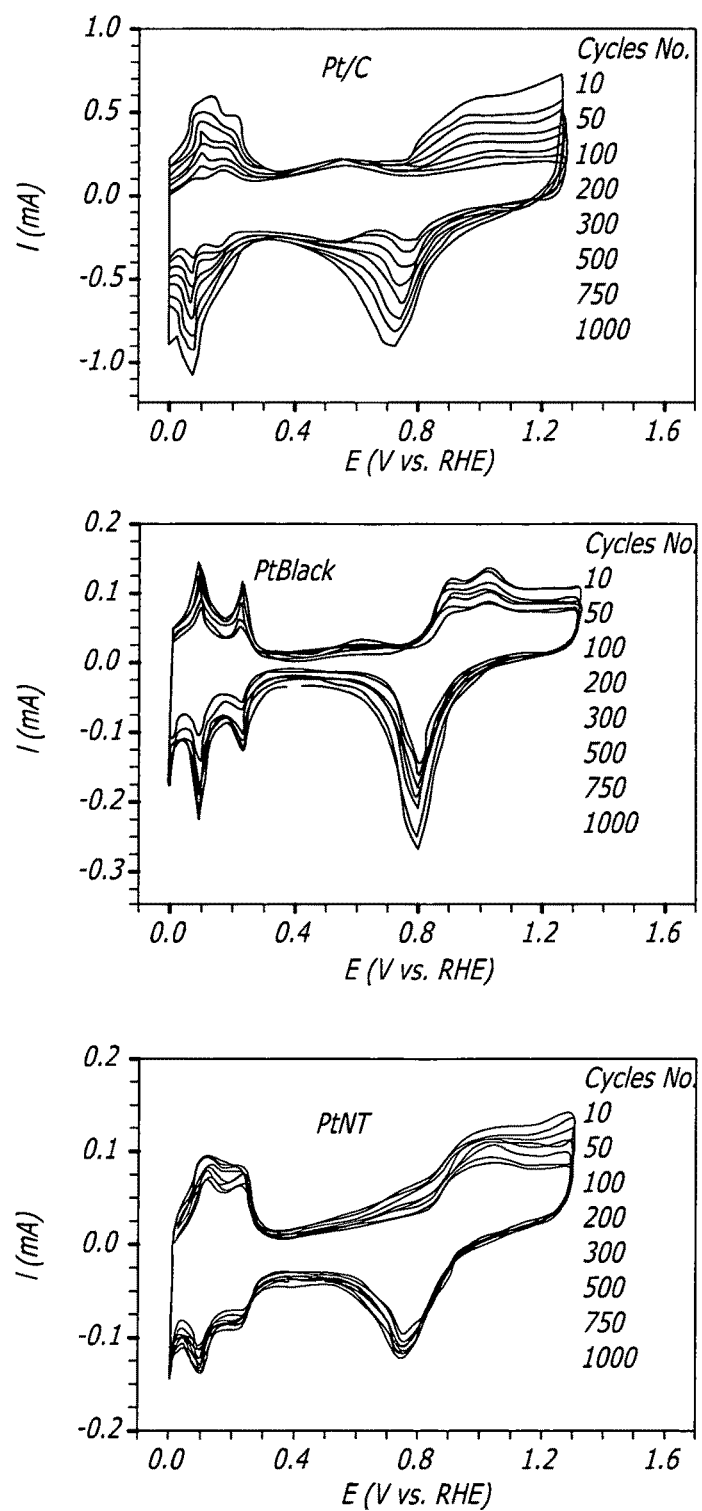
FIG. 22 are graphical representations of Cyclic voltammetry (CV) curves versus cycle numbers for (A) Pt/C, (B) PtB and (C) PtNTs.
Figure 23:
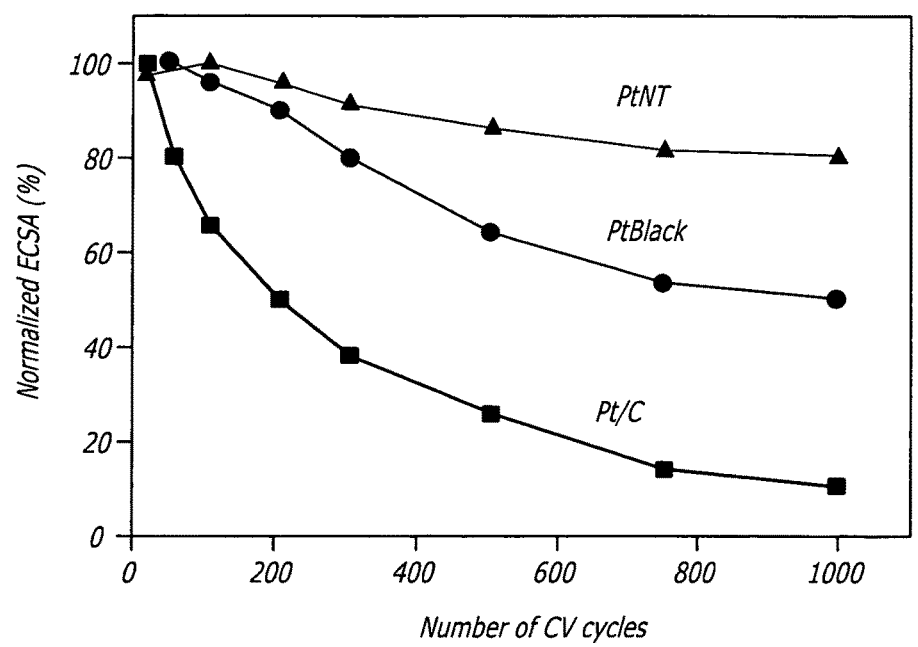
FIG. 23 is a schematic diagram of normalized electrochemical surface area (ECSA) as a function of the cyclic voltammetry (CV) cycle number obtained for platinum on carbon (Pt/C), commercial platinum-black and platinum nanotubes (PtNTs) according to the present invention.

The degradation of an electrocatalyst can be evaluated by repeated cyclic voltammetry (CV) cycles with the proper lower and upper potential limits in an acid solution. The durability tests were conducted by cycling the electrode potential between zero and 1.3 V vs. RHE at a scan rate of fifty mV/s in a $N_2$ purged 0.5 M $H_2SO_4$ solution at 60° C. The cyclic voltammograms for Pt/C (twenty weight percent platinum on Vulcan XC-72, ETEK), platinum black (PtB, ETEK) and PtNTs (FIG. 22) show a significant decrease of Pt ECSA for Pt/C and little reduction for PtNTs as the number of cycle increases. The normalized ECSA as a function of the CV cycle number obtained for Pt/C and PtNTs is summarized in FIG. 23. The Pt ECSA of PtNTs only decreases about 20% even after 1000 cycles while the PtB and the Pt/C catalyst has lost about 51% and 90% of their Pt ECSA, respectively.

Figure 24:
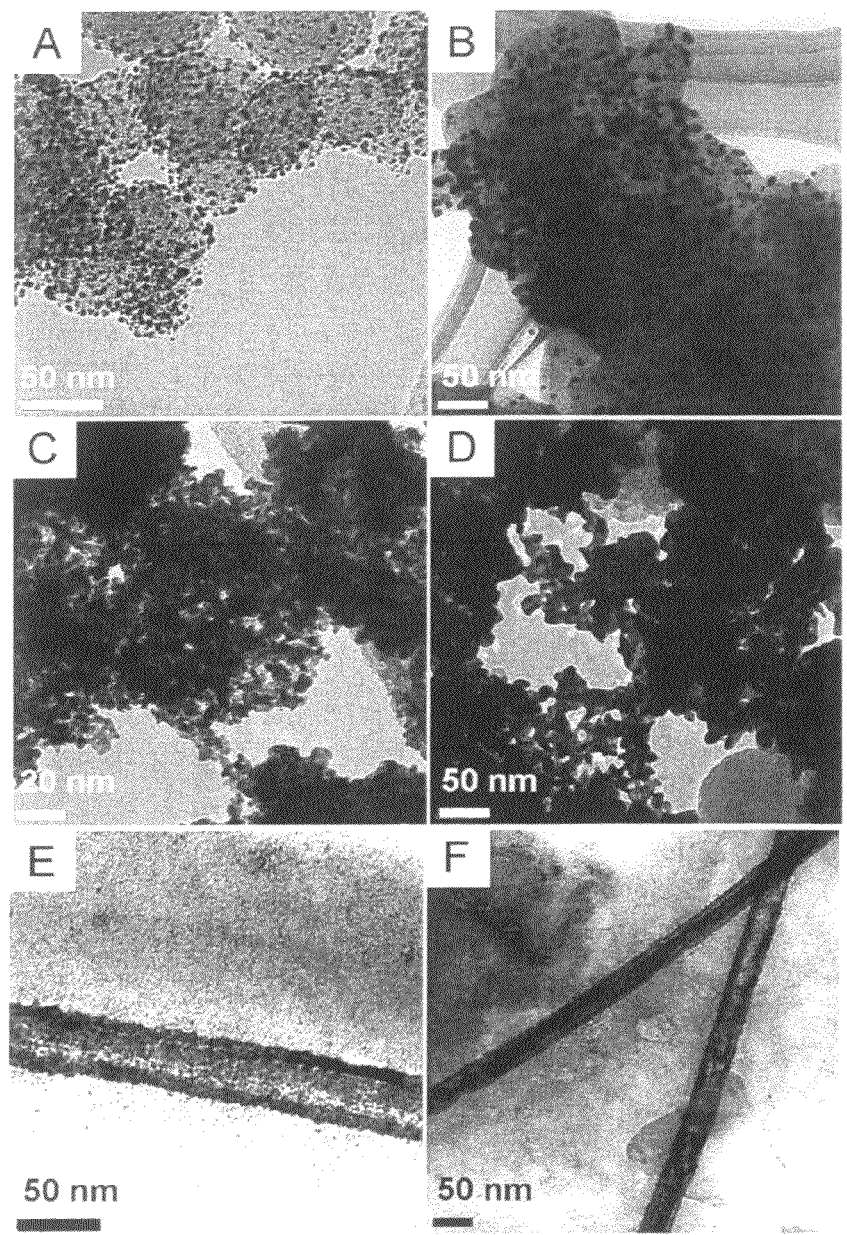
FIG. 24 are TEM images of Pt/C (A) before, (B) after accelerated CV test; and of PtB (C) before, (D) after accelerated CV test; and of PtNTs (E) before, (F) after accelerated CV test.

The Pt/C, PtB and PtNTs catalysts were examined by TEM after the CV cycling. The platinum nanoparticle size in the Pt/C catalyst increased from 2-5 nm to 10-20 nm (about 5 times increase) after the CV cycling (FIGS. 24A and 24B) confirming that the major cause for the platinum ECSA loss of Pt/C is by platinum nanoparticle ripening and possibly by aggregation due to carbon corrosion. At the same time, the particle size of PtB increased from five to ten nanometers to ten to twenty-five nanometers (FIGS. 24C and 24D) after CV cycling, which proves the platinum nanoparticle growth driven by surface energy minimization and Ostwald ripening. By contrast, there are no noticeable morphological changes for the PtNTs after the CV cycling (FIGS. 24E and 24F). The small drop in platinum ECSA may be due to mild dissolution of platinum nanoparticles because the other three mechanisms, namely, Ostwald ripening, aggregation and carbon corrosion appear to be eliminated due to the micrometer-sized length and the absence of the carbon support.

Figure 25:
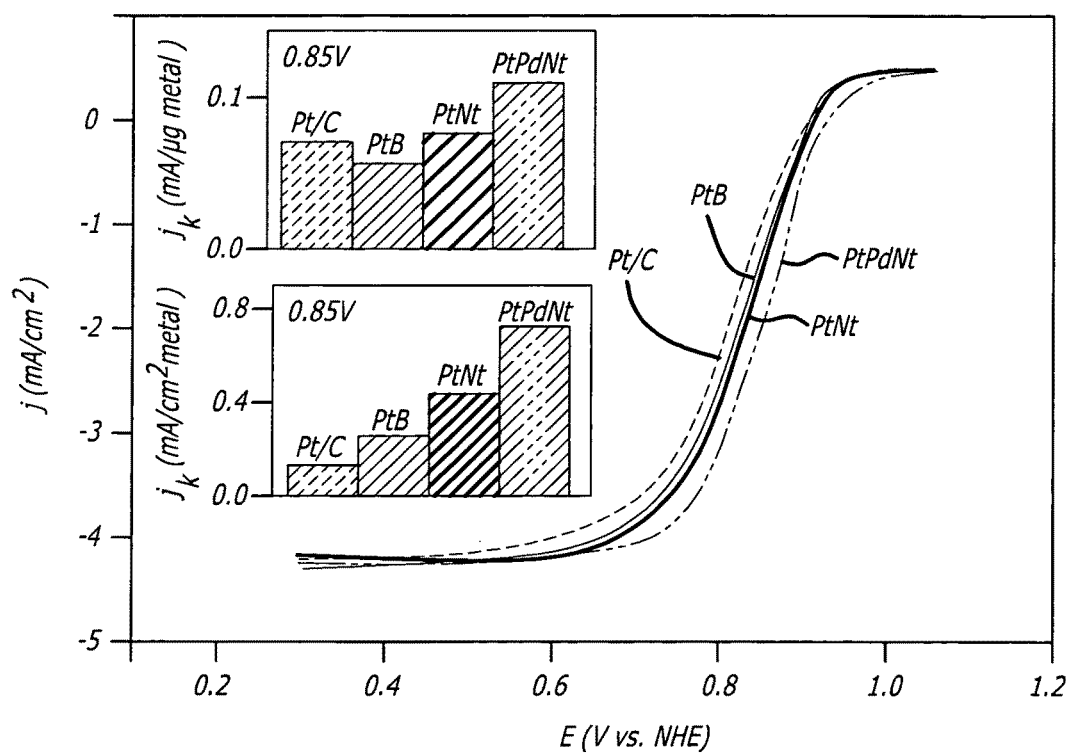
FIG. 25 depicts oxidation reduction reaction (ORR) polarization curves for platinum on carbon (Pt/C), commercial platinum-black, platinum nanotubes (PtNTs) and platinum-palladium nanotubes (PtPdNTs) according to the present invention.

FIG. 25 demonstrates typical ORR polarization curves of Pt/C and PtNTs obtained at room temperature in $O_2$ saturated 0.5 M $H_2SO_4$ using a rotating disk electrode (RDE) at 1600 rpm. The half-wave potentials of PtNTs, PtB and Pt/C are 837, 817 and 828 mV, respectively, showing that the activity of PtNTs is higher than that of the commercial PtB and Pt/C catalyst. The insert in FIG. 25 shows their mass activity and specific activity that are better indicator of an electrocatalysts' quality. PtNTs have a slightly higher mass activity, but significantly higher (3.8 times) specific activity than Pt/C at 0.85 V. And both the mass activity and specific activity of the PtNTs is higher (1.4 and 1.8 times, respectively) than that of the PtB. The improved activity of PtNTs might be due to the preferential exposure of certain crystal facets of PtNTs. The mass activity of PtNTs can be further improved by reducing the wall thickness of PtNTs and the use of Pt alloy nanotubes.

Figure 26:
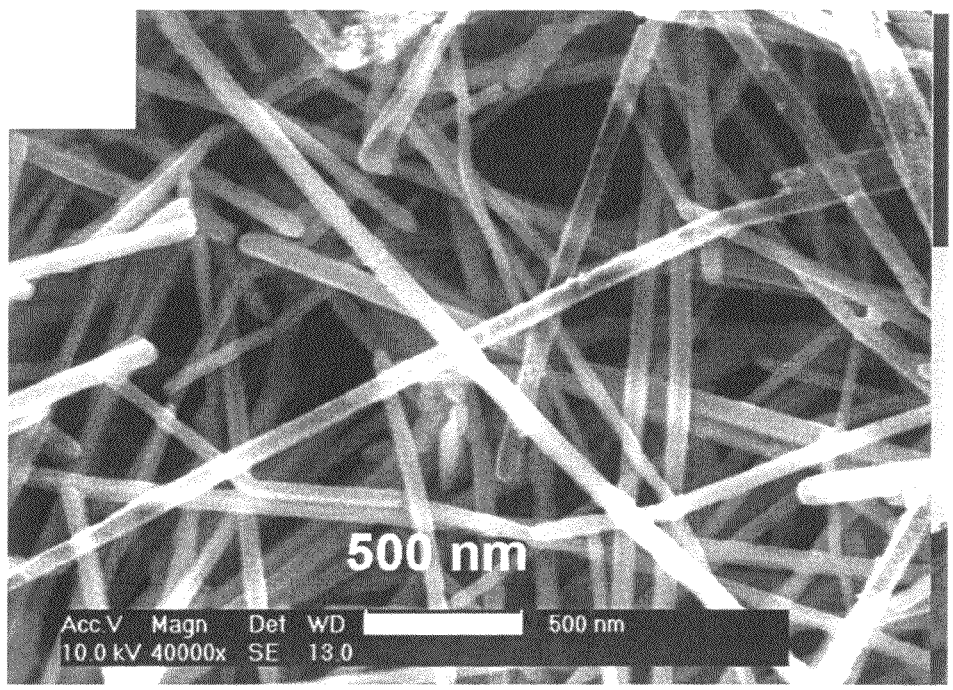
FIG. 26 is a SEM image of platinum-palladium nanotubes (PtPdNTs) made from silver nanowires according to the present invention.
Figure 27:
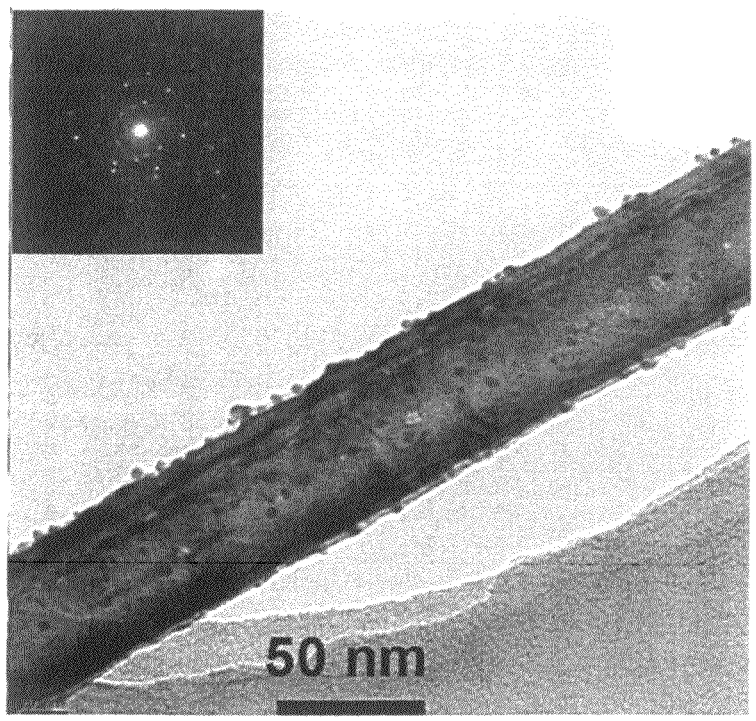
FIG. 27 is a TEM image and an electron diffraction pattern (inset) of platinum-palladium nanotubes (PtPdNTs) made from silver nanowires according to the present invention.
Figure 28:
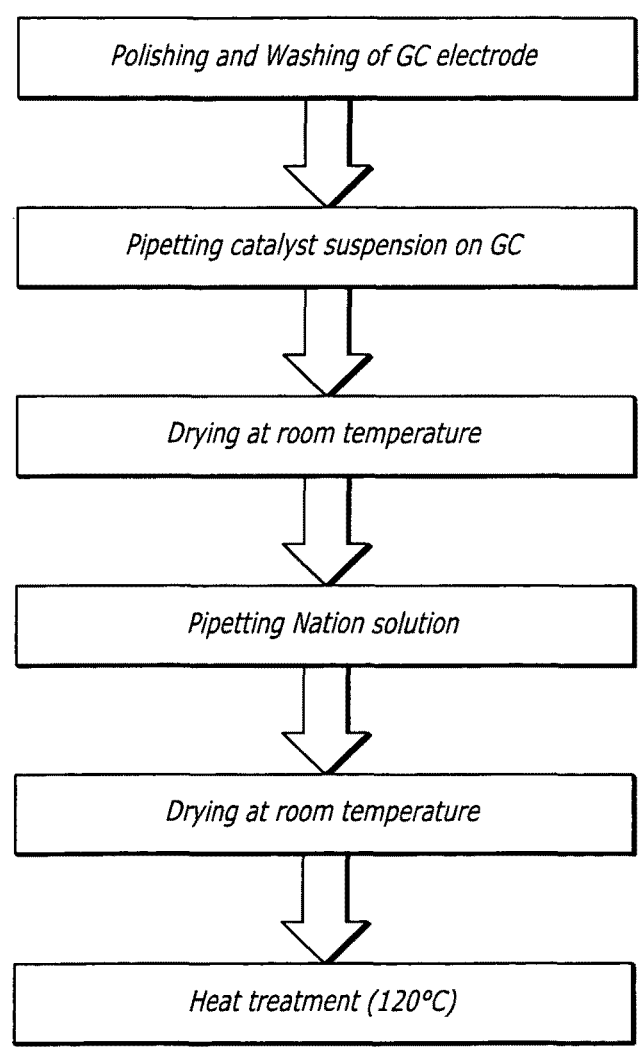
FIG. 28 is a flow chart of the preparation protocol of catalyst dispersed GC disk electrode.

To obtain higher mass activity and take advantage of the higher activity offered by certain Pt alloys as shown in the literature, PtPdNTs were synthesized. The SEM and TEM images (FIGS. 26 and 27) show uniform diameters (45 nm), wall thickness (7 nm) and length (10 μm) of the PtPdNTs. The inset of FIG. 27 shows an electron diffraction pattern of PtPdNTs. The ORR curve (FIG. 27) shows the half-wave potential of the PtPdNTs is 851 mV, which is higher than that of PtNTs, PtB and Pt/C. The mass activity of PtPdNTs is 1.4 and 2.1 times higher than Pt/C and PtB, and the specific activity of PtPdNTs is even 5.8 and 2.7 times higher than that of Pt/C and PtB electrocatalyst at 0.85 V. The improved ORR kinetic of PtPdNTs compared to PtNTs could be due to change of bond distances which is shown in fcc lattice parameters changes by the XRD results and also has been suggested in the literature.

By taking advantage of the recent advances in nanotechnology, there has been demonstrated a new generation of supportless electrocatalyst based on PtNTs and PtPdNTs, which, due to their unique combination of dimensions. Specifically they have the potential to possess high surface area, high utilization, high activity and high durability.

Experimental Procedures 1.1 Silver Nanowires Preparation

Silver (Ag) nanowires were synthesized by reducing $AgNO_3$ (Aldrich, 99+%) with ethylene glycol (EG) (anhydrous, 99.8%, Fisher) in the presence of Pt seeds and poly (vinyl pyrrolidone) (Aldrich, Mw≈40,000) PVP. In a typical synthesis, 50 ml ethylene glycol (EG) was refluxed in three-necked round-bottom flask (equipped with a condenser, thermocontroller, and magnetic stirring bar) at 165° C. for one hour, then five mL of $H_2PtCl_6$ (Aldrich, 99.9%) solution ($2\times10^{-4}$ M, in EG) was added. After five minutes, 25 mL of $AgNO_3$ solution (0.12 M, in EG) and 50 mL of PVP solution (0.36 M, in EG) were added dropwise (simultaneously) to the hot solution over a period of six minutes. When the first drops of silver nitrate and PVP EG solutions were added, the mixture turned yellow immediately. With the injection continuing, the solution became opaque gradually. After injection, the solution turned turbid with a grey color in about fifteen minutes, indicating the appearance of Ag nanowires, and the reaction continued at 165° C. for fifty minutes. Vigorous stirring was maintained throughout the entire process. The product could be purified by centrifugation. In this case, the reaction mixture was diluted with acetone and centrifuged at 3000 rpm for fifteen minutes. The supernatant containing silver particles could be easily removed using a pipet. This centrifugation procedure could be repeated several times until the supernatant became colorless.

1.2 Pt Nanotubes (PtNT) Preparation

In a typical PtNT synthesis, a five mL aliquot of the as-synthesized silver nanowires was diluted with one-hundred mL water and then refluxed in three-necked roundbottom flask at boiling temperature for ten minutes. Fifty mL of one mM $Pt(CH_3COOH)_2$ (98%, City Chemical LLC) aqueous solution were added dropwise and slowly to the refluxing solution with fifteen minutes. This mixture was continuously refluxed until its color became stable. Vigorous stirring was maintained throughout all syntheses. Before PtNTs were used as catalysts, acid treatment and annealing treatment were needed. Acid treatment was performed in 0.5 M $HNO_3$ solution for two hours with stirring. The PtNTs were separated by centrifuge with DDI $H_2O$ washing and ethanol. The heat treatment was carried out under flow of Argon in an oven at 250° C. for 1 hour.

1.3 PtPd Nanotubes (PtPdNTs) Preparation

In a typical replacement reaction, a five mL aliquot of the as-synthesized silver nanoparticles or silver nanowires was diluted with one-hundred mL water and then refluxed in three-necked round bottom flask at boiling temperature for ten minutes. Forty mL of one mM $Pt(CH_3COO)_2$ aqueous solution and ten mL of one mM $Pd(NO_3)_2$ (99.9%, Aldrich) were added dropwise and slowly to the refluxing solution (Pt:Pd=4:1) with fifteen minutes, and kept refluxing until its color became stable. The PtPdNTs were separated by centrifuge with DDI $H_2O$ washing.

Before PtPdNTs were used as catalysts, acid treatment and annealing treatment were needed. Acid treatment was performed in 0.5 M $HNO_3$ solution two hours with stirring. The PtPdNTs were separated by centrifuge with DDI $H_2O$ washing and ethanol. The heat treatment was carried out under flow of Argon in an oven at 250° C. for one hour.

1.4 Electrode Preparation

The electrochemical measurements were conducted in a thermostated standard electrochemical cell using a glassy carbon (GC) rotating disk electrode (RDE) setup with a multichannel potentiostats (VMP, Princeton Applied Research) and rotation control (MSR, Pine Instruments). Potentials were determined using a saturated Ag/AgCl electrode, separated from the working electrode compartment by a closed electrolyte bridge. All potentials in this study, however, refer to that of the reversible hydrogen electrode (RHE). FIG. S6 shows the preparation method of the working electrode. In short, aqueous suspensions of 2 $mg_{catalyst}ml^{-1}$ were obtained by ultrasonic mixing for about fifteen minutes. GC disk electrodes (5 mm diameter, 0.198 $cm^2$, AFE3T050GC, Pine Research Instrumentation) served as the substrate for the supported catalyst and were polished to a mirror finish (No. 40-7218 Microcloth, Buehler). An aliquot of twenty ml catalyst suspension was pipetted onto the carbon substrate, leading to a metal loading of 40 $\mu g_{metal}$ $cm^{-2}$ for Pt/C, PtB, PtNTs and PdPtNTs. After evaporation of the water in air, 10 µl of a 0.05 weight percent NAFION solution (diluted from five weight percent NAFION, Ion Power Inc.) was pipeted on the electrode surface in order to attach the catalyst particles onto the glassy carbon RDE, yielding a NAFION film thickness of ca. 0.1 µm. Finally, Nafion-coated catalyst layer on the GC was heated at 120° C. for one hour in air.

1.5 Electrochemical Measurements

The cyclic voltammetry (CV) test for accelerated durability test is performed on the working electrode by cycling the voltage between 0 V to 1.3 V vs RHE in a Ar purged 0.5 M $H_2SO_4$ solution at 60° C. The scan rate used was fifty mV/s. The electrochemical surface areas were calculated from the $H_2$ desorption peak of the CV cycle. Totally one-thousand cycles of CV are performed for each case.

The area of adsorption or desorption of atomic hydrogen on the curve of the cyclic voltammogram has been frequently used to estimate the surface area of catalysts. The cathodic and the anodic peaks appearing between 0 and 0.35 V versus RHE originated from H-adsorption and H-desorption in acidic media. By using the charge passed for H-desorption $Q_H$, electrochemical active surface area (ECSA) of platinum can be estimated:

$$ECSA = \frac{Q_H}{m \cdot c} \quad (1)$$

where $Q_H$=the charge for hydrogen desorption (mC/cm$^2$), m=the Pt loading (mg/cm$^2$) in the electrode c=the charge required to oxidize a monolayer of hydrogen on Pt (0.21 mC/cm$^2$).

For the oxygen reduction experiments the electrolyte was saturated with oxygen. The electrode potential was cycled several times between 0 and 1.3 V in order to produce a clean electrode surface. Current densities are normalized either to the geometric area of the glassy carbon substrate (0.198 cm$^2$) or the Pt surface area. The scan rate used was five mV/s.

The measured current density, j, is described by the following relation:

$$\frac{1}{j} = \frac{1}{j_k} + \frac{1}{j_d} \quad (2)$$

Where $j_k$ and $j_d$ are the kinetically and diffusion-limited current densities, respectively.

Then the kinetic currents were calculated based on equation (3):

$$j_k = \frac{j_d * j}{j_d - j} \quad (3)$$

1.6 Physical Characterization

Transmission electron microscopy (TEM) was carried out on a PHILIPS CM300 operating at three-hundred kV. Scanning electron microscopy (SEM) was conducted on a PHILIPS XL30-FEG at ten KV. X-ray diffraction (XRD) patterns were obtained on a Bruker D8 Advance Diffractometer (Bruker AXS) using a Cu Kα radiation.

2. Alternative Methods 2.1 Silver Nanowire Method

Silver nanowires were synthesized by reducing $AgNO_3$ with ethylene glycol (EG) in the presence of Pt (or Ag) seeds and PVP. In a typical synthesis, five mL of $H_2PtCl_6$ solution (2×10$^4$ M, in EG) was added to fifty mL of EG heated at 165° C. in a round-bottom flask (equipped with a condenser, thermo-controller, and magnetic stirring bar). After five minutes, twenty-five mL of AgNO solution (0.12 M, in EG) and fifty mL of PVP solution (0.36 M, in EG) were added dropwise (simultaneously) to the hot solution over a period of six minutes. The reaction mixture was continued with heating at 165° C. for thirty to sixty minutes. Vigorous stirring was maintained throughout the entire process. The product could be purified by centrifugation. In one example, the reaction mixture was diluted with acetone and centrifuged at 3000 rpm for fifteen minutes. The supernatant containing silver particles could be easily removed using a pipette. The centrifugation procedure could be repeated several times until the supernatant became colorless.

In a typical replacement reaction, a 2.5 mL aliquot of the as-synthesized silver nanoparticles or silver nanowires was diluted with fifty mL water and then refluxed at boiling temperature for ten minutes. Aliquots of one mM $PtCl_2$ (99.9%, Aldrich) aqueous solution were added dropwise to the refluxing solution. This mixture was continuously refluxed until its color became stable. Vigorous stirring was maintained throughout all syntheses. A similar procedure may be applied to form platinum based alloy nanotubes by using Au3+, Pt2+, Pd2+, Ir3+, Ru3+, Rh3+ and other metal salts solution as precursors.

Before Pt and Pt based alloy nanotubes being used as catalysts, annealing treatment and acid treatment are preferred. The heat treatment is being done under flow of Argon in an oven at 350° C. for a certain time (for example, one to ten hours). Acid treatment is performed in two to six M $HNO_3$ solution overnight with stirring. The nanotubes can be separated by centrifuge with DDI $H_2O$ washing.

2.2 Selenium Nanowire Method

The solid selenium was formed in situ as spherical colloids by refluxing one-hundred mL selenious acid (0.05 M) with an excess amount of hydrazine (for example, ten mL of 0.6 M) at different temperatures (for example, 80° C., 90° C. or 100° C.) in a round-bottom flask for fifteen minutes. A brick-red color immediately appeared in the solution, indicating the formation of amorphous Se or a-Se that existed in the form of spherical colloids with sizes around 300 nm. Then the solution was diluted with three-hundred ml DDI $H_2O$. The solution cooled to room temperature in thirty minutes. When this solution was cooled to room temperature, the small amount of selenium dissolved in the solution precipitated out as nanocrystallites Se or t-Se. This colloidal dispersion was then aged in the dark at room temperature for seven to ten days. The products were centrifuged several times at 3000 rpm for fifteen minutes.

The selenium nanowires (about one mmol) were dispersed with shaking in ten mL of ethanol hosted in a twenty mL scintillation vial. Platinum (II) chloride (2-10 mmol) was added. The vial was capped and heated at a temperature in the range of 40° C. to 70° C. under magnetic stirring until the desired thickness of Pt coating was achieved. The Se—Pt nanostructures were isolated by filtration on track-etched polycarbonate membranes and rinsed twice with five mL of dilute HCl and twice with five mL of hot water (90° C.). Pure Pt nanotubes were obtained by soaking the Se—Pt nanostructures in hydrazine for three to five hours and recovering them on TEFLON (polytetrafluoroethylene—PTFE) filters, followed by rinsing twice with five mL of ethanol. It was also possible to remove the Se cores by heating the dried samples on a hotplate at 200° C. to 250° C. for one to five minutes. A similar procedure may be applied to form platinum based alloy nanotubes by using Au3+, Pt2+, Pd2+, Ir3+, Ru3+, Rh3+ and other metal salts solution as precursors.

2.3 Surfactant Method

In a typical fabrication process, a mixture of hexachloroplatinic acid ($H_2PtCl_6$), nonaethylene glycol monododecyl ether ($C_{12}EO_9$), polyoxyethylene (20) sorbitan monostearate (Tween 60) and $H_2O$ in a 1:1:1:60 molar ratio was shaken at 60° C., then cooled to between 15° C. and 25° C. and allowed to stand at that temperature for thirty minutes. An excess amount of hydrazine was added to the cooled (25° C.) pasty material and then kept at that temperature for twenty-four hours. The resulting solid was separated, washed with water and then repeatedly with ethanol prior to drying in air. Similar syntheses of platinum based alloy nanotubes may be formed by using Au3+, Pt2+, Pd2+, Ir3+, Ru3+, Rh3+ and other metal salts solution.

The electrochemical characterizations of the catalysts were conducted in a thermostated (25° C.) three-compartment glass cell using Solartron electrochemical interface (SI1287). Electrode potentials were measured and reported against an Ag/AgCl electrode placed close to the working electrode through Luggin capillary. A platinum wire was used as counter electrode. The working electrode (rotating disk electrode) was prepared by applying catalyst ink to the glassy carbon disk (Pine Instrument, five mm diameter). The catalyst ink was produced by ultrasonically dispersing 4.0 mg catalyst in one mL ethanol for thirty minutes. Before each experiment the glassy carbon disk was polished to a mirror finish with 0.05 μm silica suspension, followed by ultrasonicating in acetone and DI water. An aliquot of ten μL catalyst suspension was then pipetted onto the disk, leading to a platinum loading of forty μg/cm². After drying the suspension at 80° C., ten μL of a 0.05 weight percent NAFION solution (diluted from five weight percent, Ion Power Inc.) was pipetted on the electrode surface in order to attach the catalyst particles onto the glassy carbon substrate.

While particular forms of the invention have been illustrated and described, it will also be apparent to those skilled in the art that various modifications can be made without departing from the inventive concept. References to use of the invention with a membrane electrode assembly and fuel cell are by way of example only, and the described embodiments are to be considered in all respects only as illustrative and not restrictive. The present invention may be embodied in other specific forms without departing from its spirit or essential characteristics. Accordingly, it is not intended that the invention be limited except by the appended claims.

We claim:

1. A nanotube, consisting of:
a seamless cylindrical wall; and
an empty inner space;
the cylindrical wall comprising:
at least one platinum group element
wherein
a thickness of the wall is from 5 to 10 nm,
an outer diameter of the cylindrical wall is from 5 to 100 nm, and
a length of the nanotube is from 0.1 to 100 μm.

2. The nanotube of claim 1, wherein the cylindrical wall consists of platinum.

3. The nanotube of claim 1 wherein the cylindrical wall comprises platinum and another platinum group element.

4. The nanotube of claim 3, wherein the another platinum group element is palladium.

5. The nanotube of claim 1, wherein the cylindrical wall further comprises at least one non-platinum group element.

6. The nanotube of claim 1 wherein the length of the nanotube is greater than about 5 μm.

7. The nanotube of claim 1 wherein the outer diameter of the cylindrical wall is greater than about 40 nm.

8. A fuel cell, comprising:
an electrolyte membrane; and
a catalyst layer on the membrane;
wherein the catalyst layer comprises a plurality of the nanotubes, the plurality of nanotubes comprising:
a seamless cylindrical wall; and
an empty inner space;
the cylindrical wall comprising:
at least one platinum group element
wherein a thickness of the wall is from 5 to 10 nm, an outer diameter of the cylindrical wall is from 5 to 100 nm, and a length of the nanotube is from 0.1 to 100 µm.

9. The fuel cell of claim 8 wherein the cylindrical walls of the nanotubes are vertically aligned with respect to a surface of the electrolyte membrane.

10. The fuel cell of claim 8 wherein a thickness of the catalyst layer is less than 500 nm.

11. The fuel cell of claim 8 wherein when the catalyst layer is subjected to 1000 cyclic voltammetry (CV) scans in a $N_2$ purged 0.5 M sulfuric acid solution at 60° C., each scan initiated at a lower voltage of 0.0V and scanned at a rate of fifty mV/s from the lower voltage to an upper voltage of 1.3V, the voltage being measured with respect to a reversible hydrogen electrode, a decrease of a normalized electrochemical surface area of the catalyst layer is 20% or less.

12. The fuel cell of claim 11 wherein, after 1000 CV scans, the nanotubes have no noticeable morphological changes when examined by TEM.

13. The fuel cell of claim 8 wherein the cylindrical wall consists of platinum.

14. A method to prepare the nanotube of claim 1, the method comprising:
reducing a platinum group ion to the element in the presence of a silver nanowire by galvanic reaction; and
depositing the platinum group element on a surface of the silver nanowire;
wherein the silver of the nanowire is simultaneously oxidized and displaced from the nanowire.

* * * * *